(12) United States Patent
Ito

(10) Patent No.: US 7,840,617 B2
(45) Date of Patent: Nov. 23, 2010

(54) HOST DEVICE AND MEMORY SYSTEM

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 11/967,544

(22) Filed: Dec. 31, 2007

(65) Prior Publication Data
US 2008/0172427 A1 Jul. 17, 2008

(30) Foreign Application Priority Data
Jan. 12, 2007 (JP) .............................. 2007-004673

(51) Int. Cl.
*G06F 12/00* (2006.01)
*G06F 17/30* (2006.01)
(52) U.S. Cl. .................. 707/822; 707/823; 707/824; 707/828; 711/117; 711/205; 711/207
(58) Field of Classification Search ............... 707/205, 707/822
See application file for complete search history.

(56) References Cited

U.S. PATENT DOCUMENTS

| | | | |
|---|---|---|---|
| 5,592,669 A * | 1/1997 | Robinson et al. ................... 1/1 |
| 6,567,887 B2 * | 5/2003 | Harmer ........................ 711/112 |
| 6,823,417 B2 * | 11/2004 | Spencer ....................... 710/305 |
| 2004/0098428 A1 * | 5/2004 | Schulze et al. ............... 707/205 |
| 2006/0026340 A1 * | 2/2006 | Ito et al. ...................... 711/103 |
| 2006/0129749 A1 * | 6/2006 | Nakanishi et al. ........... 711/103 |
| 2007/0033373 A1 * | 2/2007 | Sinclair ....................... 711/203 |
| 2007/0043924 A1 | 2/2007 | Ito et al. |
| 2007/0276986 A1 * | 11/2007 | Honda ......................... 711/103 |

OTHER PUBLICATIONS

U.S. Appl. No. 12/388,089, filed Feb. 18, 2009, Ito.

* cited by examiner

*Primary Examiner*—Kuen S Lu
*Assistant Examiner*—Binh V Ho
(74) *Attorney, Agent, or Firm*—Oblon, Spivak, McClelland, Maier & Neustadt, L.L.P.

(57) ABSTRACT

A memory system includes a nonvolatile semiconductor memory and a controller which controls the semiconductor memory, the memory system being inserted into the host device. The host device further includes a file management system which allocates a cluster defined in a FAT file system to write data and manages the data allocated to the cluster by using management data including a file allocation table defined in the FAT file system and a directory entry. The directory entry includes a root directory entry serving as entry information of a root directory of an uppermost layer and a sub-directory entry serving as entry information of a sub-directory belonging to the root directory. The file system allocates the plurality of clusters in a predetermined range in which addresses are serial to the management data.

22 Claims, 18 Drawing Sheets

| 7 | 6 | 5 | 4 | 3 | 2 | 1 | 0 |
|---|---|---|---|---|---|---|---|
| 1 | 0 | 0 |   |   |   |   |   |

Bit7　CT　　0=Management data allocation position is not limited
　　　　　　1=Management data allocation position is limited
Bit6　OW　　0=Overwrite of file data is permitted
　　　　　　1=Overwrite of file data is inhibited
Bit5　FC　　0=Memory card does not rewrite FAT
　　　　　　　(FAT reread after file write is unnecessary)
　　　　　　1=Memory card may rewrite FAT
　　　　　　　(FAT reread after file write is necessary)

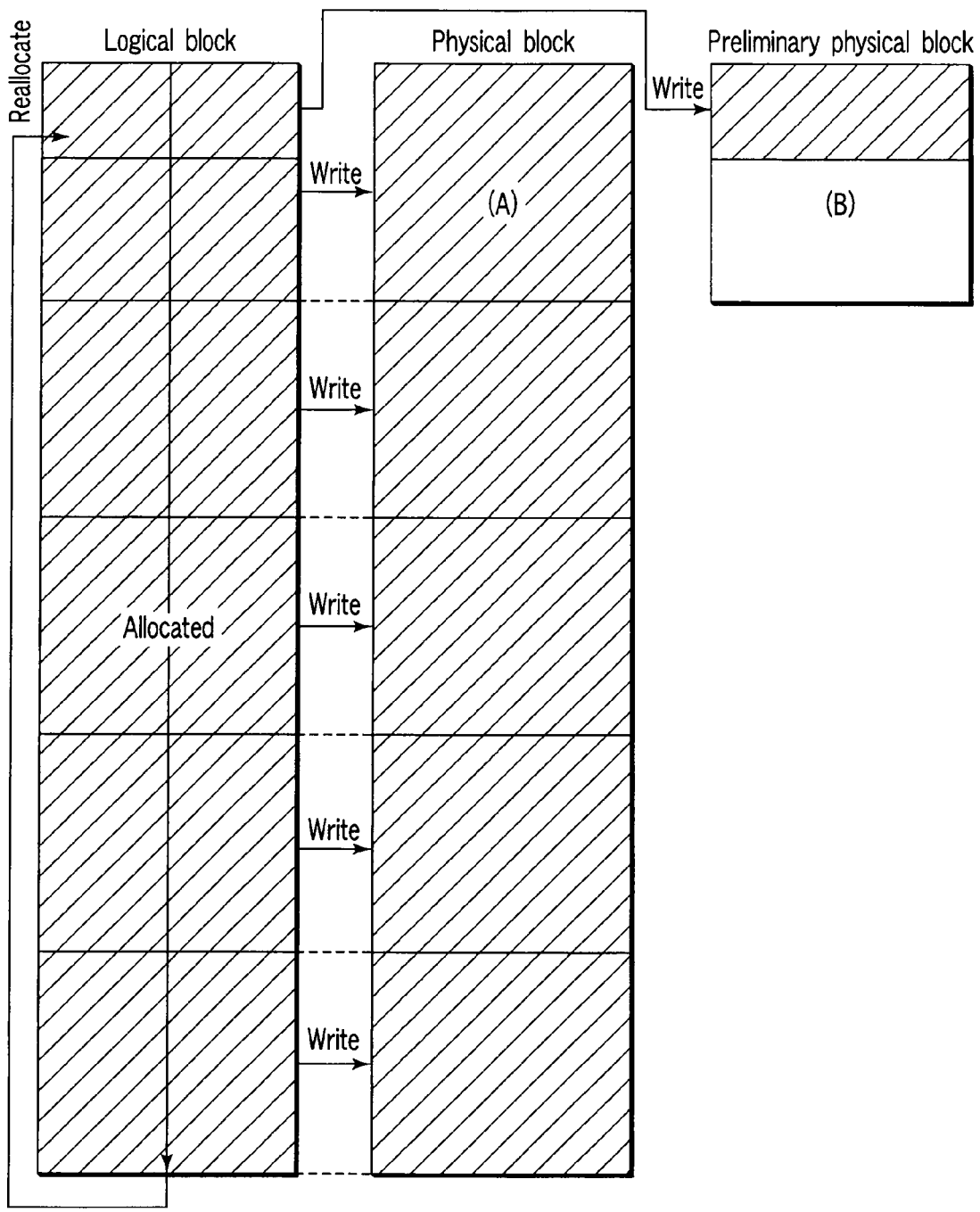
F I G. 20

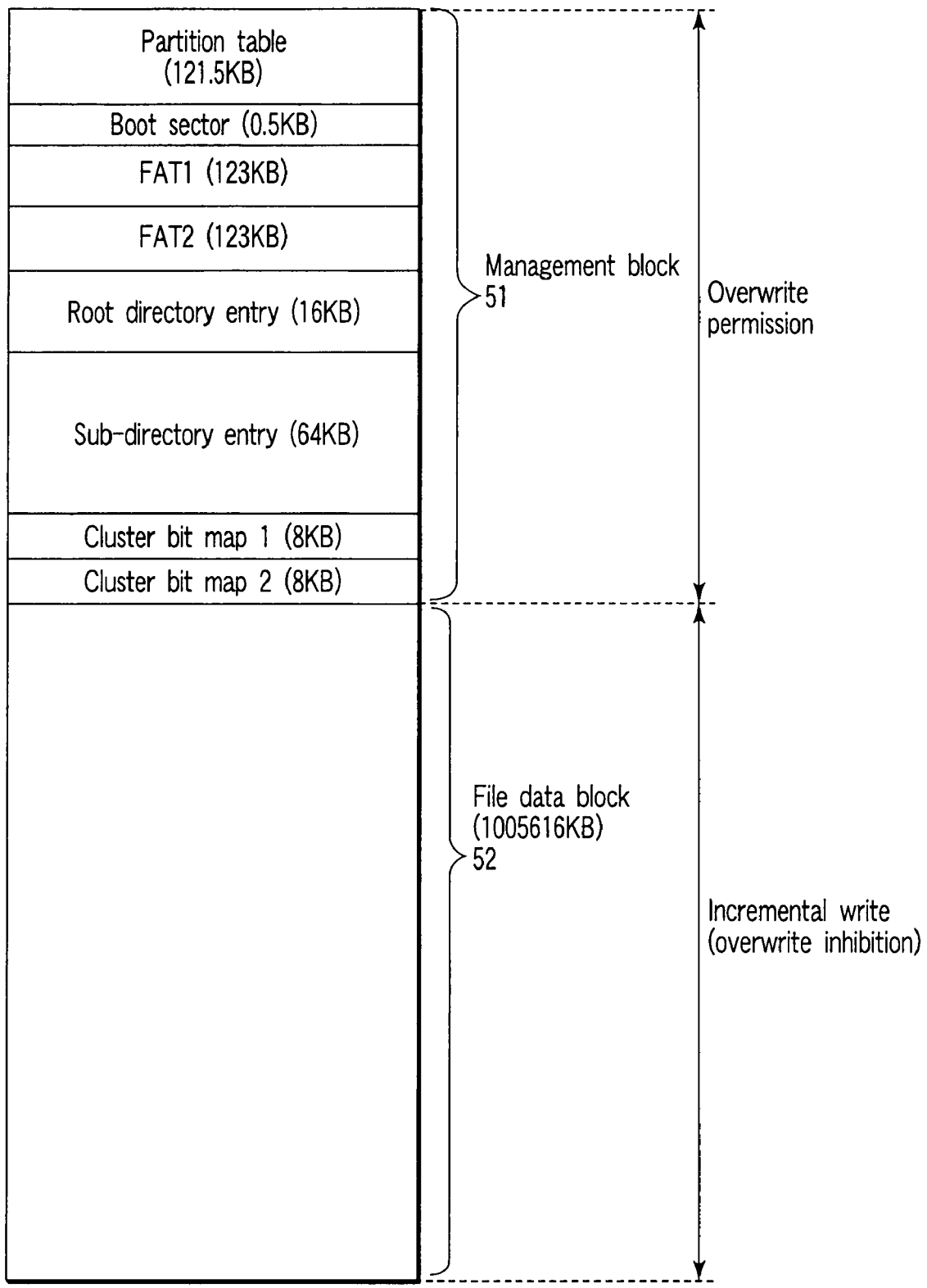
F I G. 23

HOST DEVICE AND MEMORY SYSTEM

CROSS-REFERENCE TO RELATED APPLICATIONS

This application is based upon and claims the benefit of priority from prior Japanese Patent Application No. 2007-004673, filed Jan. 12, 2007, the entire contents of which are incorporated herein by reference.

BACKGROUND OF THE INVENTION

1. Field of the Invention

The present invention relates to a host device and a memory system, for example, a memory system having a NAND flash memory and a controller for controlling the memory, and a host device in which the memory system is inserted.

2. Description of the Related Art

At present, a memory system typified by a memory card using a nonvolatile semiconductor memory such as a flash memory is used as recording media for music data and video data. A typical example of the flash memory used in the memory system includes a NAND flash memory.

In the NAND flash memory, writing is performed in units called pages constituted by a plurality of bits. Erasing is performed in only units called blocks constituted by a plurality of pages. For this reason, when data stored in a block is partially rewritten, new data to be rewritten must be written in a new block from which data is erased, and unrewritable data must be copied from an old block including old data (rewritten with the new data) into the new block.

This process is called "moving write (victim copy)". Since this "moving write" accompanies an operation of copying unrewritable data, overheads considerably increase when the "moving write" frequently occurs.

A file allocation table (FAT) file system is used as a file system to manage data stored in a storage medium. The FAT file system allocates data to clusters (units of write areas used by the file system to manage allocation of the data to the clusters by a table called FAT. The FAT file system is a file system based on a medium, such as a hard disk, on which data can be rapidly rewritten at random. The random write is a scheme in which data is written in an idle cluster at random independently of an address of a cluster.

In the FAT file system, each time file data (real data) constituting a file is rewritten, updating of management data such as FAT occurs. For this reason, when the FAT file system is employed as a file system for managing a NAND flash memory, "moving write" occurs each time file data is rewritten, so that a file writing speed decreases.

In the future, as the NAND flash memory is anticipated to increase in capacity, so is the size of a block. As a result, this is expected to exacerbate an adverse effect such as an increase in processing time required for "moving write" or the like.

In order to cope with a defect caused by a combination between a NAND flash memory and a FAT file system, it is proposed that an incremental write file system, such as a universal disc format (UDF), is used in a host device (Jpn. Pat. Appln. KOKAI Publication No. 2006-040264).

Use of the incremental write file system enables data to be efficiently written in a memory system using a NAND flash memory.

However, the incremental write file system is not compatible with the FAT file system. Furthermore, a new file system must be developed for and mounted on the host device. For this reason, the manufacturer of the host device is forced to bear the burden.

BRIEF SUMMARY OF THE INVENTION

A memory system which is inserted in a host device according to an aspect of the present invention comprises a nonvolatile semiconductor memory and a controller for controlling the semiconductor memory. The host device includes a file management system which allocates a cluster defined in a FAT file system to write data and manages the data allocated to the cluster by using management data including a file allocation table defined in the FAT file system and a directory entry. The directory entry includes a root directory entry serving as entry information of a root directory of an uppermost layer and a sub-directory entry serving as entry information of a sub-directory belonging to the root directory. The file system allocates the plurality of clusters in a predetermined range in which addresses are serial to the management data.

A memory system according to another aspect of the present invention comprises a nonvolatile semiconductor memory and a controller for controlling the semiconductor memory. The controller receives write data to which a unique logical address is allocated. The controller accepts a write command of the write data to which an allocated logical address is allocated when the logical address allocated to the write data belongs to a first range, and accepts write of only the write data to which a logical address having an order higher than that of the allocated logical address is allocated when the logical address allocated to the write data belongs to a second range.

BRIEF DESCRIPTION OF THE SEVERAL VIEWS OF THE DRAWING

FIG. 20 is a diagram showing a state in the write process for the memory card;

FIG. 23 is a diagram showing a logical address to which a bit map table is allocated.

DETAILED DESCRIPTION OF THE INVENTION

Figure 1:
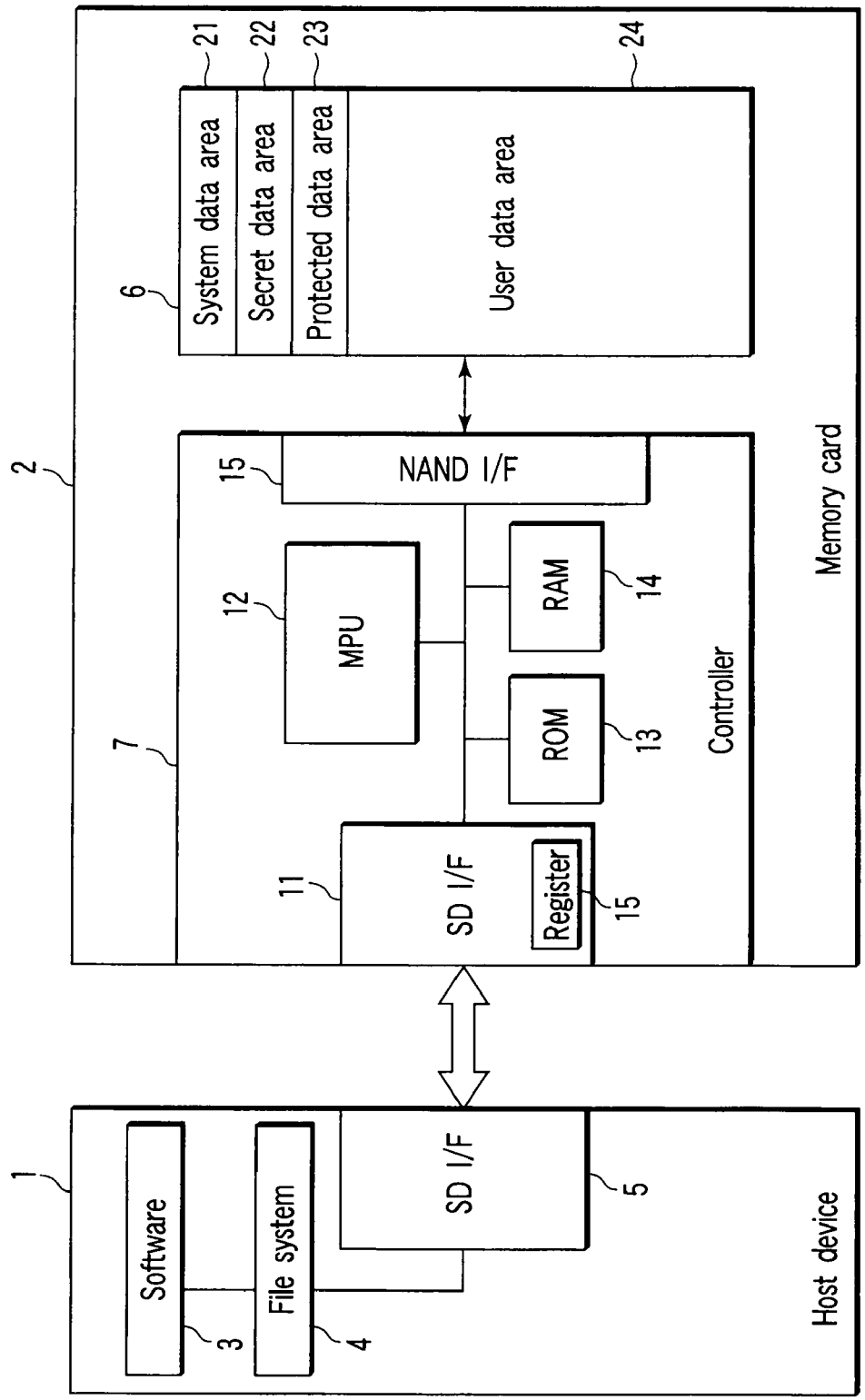
FIG. 1 is a functional block diagram of a memory system.

An embodiment of the invention will be described below with reference to the accompanying drawings. The same reference numerals as the following explanation denote constituent elements having the same functions and the same configurations, and an overlapping explanation thereof will be performed only when needed.

The embodiment described below exemplifies an apparatus and method for embodying the technical idea of the present invention. In the technical idea of the invention, the material, shape, structure, arrangement and the like of the components are not limited to the following. The technical idea of the invention as given in the claims can be variously modified.

A memory system according to the embodiment of the present invention will be explained by using a memory card as an example.

[1] Configuration

[1-1] Overall Configuration

FIG. 1 is a functional block diagram schematically showing main parts of a memory system and a host device according to an embodiment of the invention. Each functional block can be realized as any one of hardware and computer software or a combination thereof. For this reason, each block will be generally described below in terms of a corresponding function such that the blocks can be clearly specified. These functions may be executed as hardware or software depending on design constraints imposed on a concrete embodiment or an entire system. A person skilled in the art can realize these functions by various methods in units of the concrete embodiments. However, a decision of the realization is included in the spirit and scope of the present invention.

In FIG. 1, a host device (to be referred to as "host" hereinafter) 1 includes hardware and software (system) to access a memory card 2 to be inserted. The host 1 includes software such as an application and an operating system. The software 3 is designated by a user to write data in the memory card 2 and to read data from the memory card 2. The software 3 designates a file system 4 to write and read data.

The file system 4 is a device to manage a file (data) recorded on a storage medium to be managed. The file system 4 records management information in a storage area of the storage medium to manage the file by using the management information. In the file system 4, determined are a method of forming directory information such as a file or a folder in the storage medium, a method of moving or deleting a file or a folder, a data recording scheme, a position and a using method of an area in which the management information is recorded, and the like. The file system 4 is based on a FAT file system and constructed to make it possible to execute an operation through this specification. Concrete operations will be described below.

The host 1 has an SD interface 5. The SD interface 5 is constituted by hardware and software required to perform an interface process between the host 1 and the memory card 2 (controller 7). The host 1 communicates with the memory card 2 through the SD interface 5. The SD interface 5 regulates various agreements required to cause the host 1 and the memory card 2 to communicate with each other, and includes a combination of various commands which can be recognized with an SD interface 11 (will be described later) of the memory card 2. The SD interface 5 includes a hardware configuration (such as an arrangement of pins and the number of pins) on hardware which can be connected to the SD interface 11 of the memory card 2.

When the memory card 2 is connected to the host 1 and turned on while inserted in the host 1 in an off state, the memory card 2 is initialized by a power supply and then performs a process corresponding to an access from the host 1. The memory card 2 has a NAND flash memory 6 and a controller 7 to control the memory 6.

The memory 6 non-volatilely stores data and writes and reads data in units called pages, each of which is constituted by a plurality of memory cells. To the page, a physical address inherent in each page is allocated. The memory 6 erases data in units called physical blocks, each of which is constituted by a plurality of pages. The physical addresses may be allocated in units of physical blocks.

The controller 7 manages a storage state of data stored in the memory 6. Management of the storage state refers to a relationship between a specific physical address of a page (or physical block) and a physical address allocated by the host 1, the page of the specific physical address holding data of the physical address allocated by the host 1, such that a page (or physical block) of a specific physical address is managed to be in an erase state (no data is written, or invalid data is held).

The controller 7 includes the SD interface 11, a macro processing unit (MPU) 12, a read only memory (ROM) 13, a random access memory (RAM) 14, and a NAND interface 15.

The SD interface 11 is constituted by hardware and software required to perform an interface process between the host 1 and the controller 7. The memory card 2 (controller 7) communicates with the host 1 through the SD interface 11. The SD interface 11 regulates an agreement to make it possible to communication between the memory card 2 and the host 1 like the SD interface 5, includes a combination of various commands, and also includes a configuration (such as arrangement of pins and the number of pins) on hardware.

Figure 2:
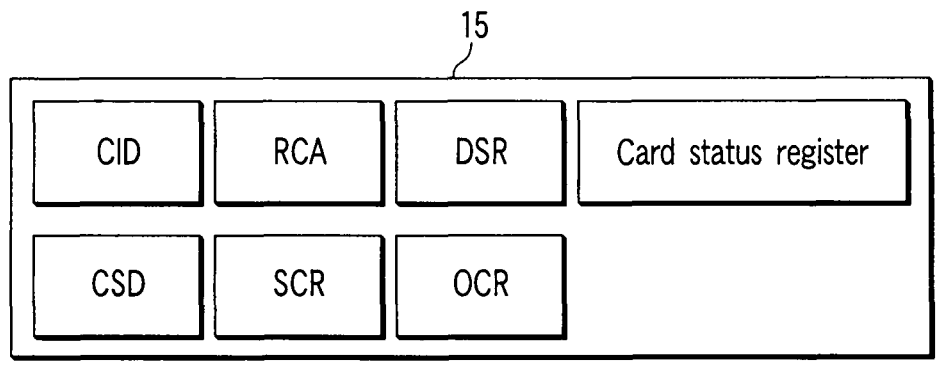
FIG. 2 is a diagram exemplifying a configuration of a register.

The SD interface 11 includes a register 15. FIG. 2 exemplifies a configuration of the register 15. The register 15 has various registers such as a card status register, a CID, an RCA, a DSR, a CSD, an SCR, and an OCR. The card status register is used in a normal operation, and stores error information, for example. The CID, the RCA, the DSR, the CSD, the SCR, and the OCR are mainly used in initialization of the memory card 2. An individual number of the memory card 2 is stored in the CID (card identification number). A relative card address is stored in the RCA (relative card address). A bus drive force or the like of the memory card 2 is stored in the DSR (driver storage register). A characteristic parameter value of the memory card 2 is stored in the CSD (card specific data). A data arrangement of the memory card 2 is stored in the SCR (SD configuration data register). In the OCR (operation condition register), an operation voltage is stored when an operation range voltage of the memory card 2 is limited.

The MPU 12 controls the overall operation of the memory card 2. The MPU 12, for example, upon receipt of a power supplied from a power supply, reads firmware (control program) stored in the ROM 13 on the RAM 14 to execute a predetermined process. The MPU 12 forms various tables (to be described later) on the RAM 14 according to the control program and receives a write command, a read command, and an erase command from the host 1 to execute a predetermined process on the memory 6.

The ROM 13 stores a control program or the like controlled by the MPU 12. The RAM 14 is used as a work area for the MPU 12 and stores a control program and various tables. The tables include a conversion table (logical-physical table) of physical addresses of pages on which data having logical addresses allocated to data by the file system 4 are actually stored. The NAND interface 15 performs an interface process between the controller 7 and the memory 6.

A storage area in the memory 6 is divided into a plurality of areas depending on types of data to be held. The areas include a system data area 21, a secret data area 22, a protected data area 23, and a user data area 24.

The system data area 21 is an area which is assured by the controller 7 to hold data required for the operation in the memory 6. The system data area 21 mainly stores management information related to the memory card 2, and also stores card information such as security information or a media ID of the memory card 2. The secret data area 22 stores key information used in encryption or secret data used in authentication, and cannot access the host 1.

The protected data area 23 stores important data or secured data. The host 1 can access the protected data area 23 only after the validity of the host 1 is proved by mutual authentication between the host 1 and the memory card 2.

The user data area 24 can be freely accessed or used by the host 1. For example, the user data area 24 stores user data such as an AV content files and image data. In the following explanation, it is assumed that the memory 6 indicates the user data area 24. The controller 7 assures a part of the user data area 24 and stores control data (logical-physical table, a finally allocated logical block address (to be described later), and the like) required for the operation of the controller 7 itself. The protected data area 23 and the user data area 24 are logically formatted as different volumes by the host 1 and subjected to file management.

[1-2] Configuration of Memory

A configuration of a memory will be described below with reference to FIGS. 3 and 4.

[1-2-1] Physical Configuration of Memory Space and Memory

A configuration of the memory space of the memory 6 will be described with reference to FIG. 3. FIG. 3 is a diagram showing the configuration of the memory space of the memory 6.

Figure 3:
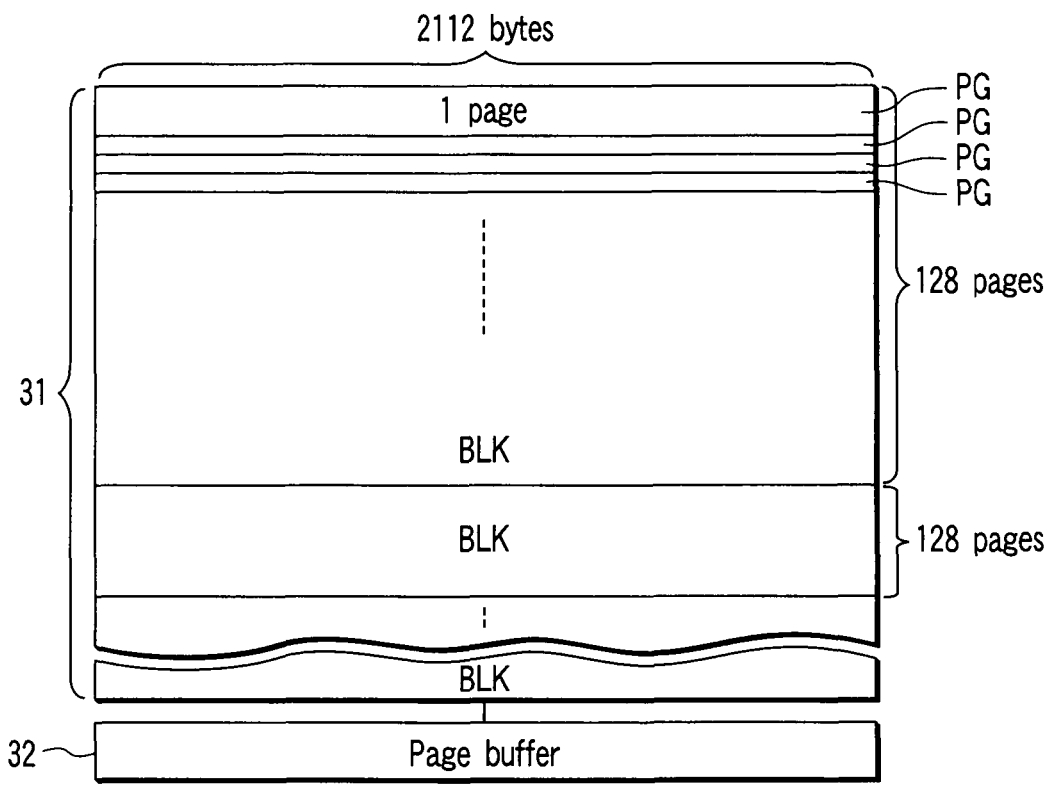
FIG. 3 is a diagram showing a configuration of a memory space of a memory.
Figure 4:
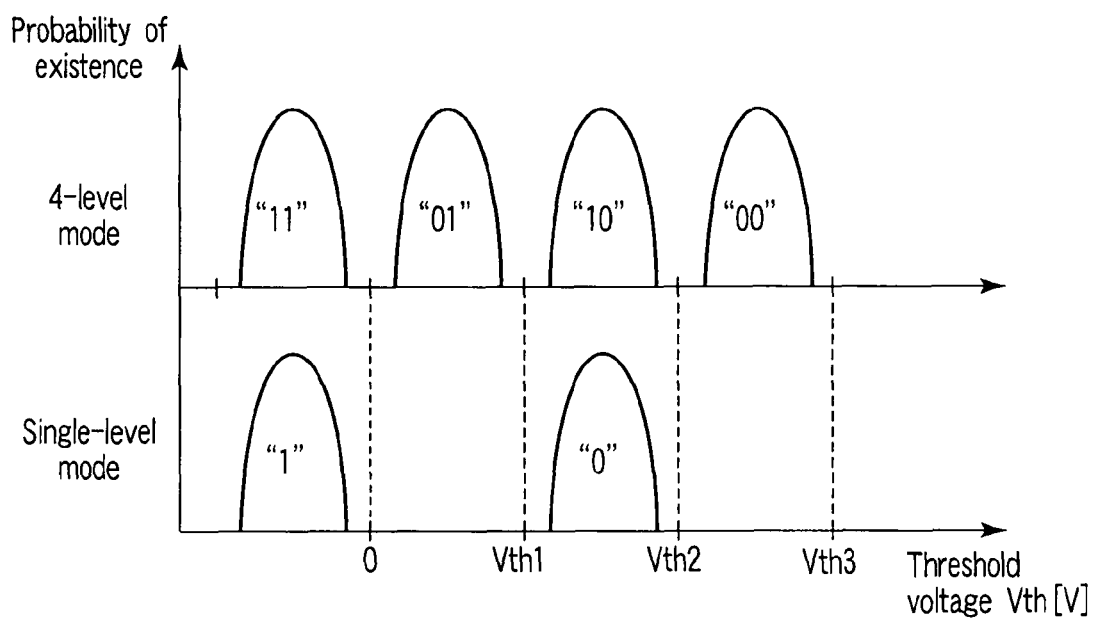
FIG. 4 is a diagram showing a single-level mode and a multi-level mode.

As shown in FIG. 3, the memory 6 has a normal memory area 31 and a page buffer 32.

The memory area 31 includes a plurality of blocks BLK. Each physical block BLK is constituted by a plurality of pages PG. Each page PG includes a plurality of memory transistors connected in series with each other.

Each memory cell is constituted by a so-called stack gate structure MOSFET (metal oxide semiconductor field effect transistor). The stack gate structure MOS transistor includes a tunnel insulating film, a floating gate electrode, an inter-electrode insulating film, a control gate electrode, and a source/drain diffusion layer. Each memory cell transistor has a threshold voltage that changes depending on the number of electrons accumulated in the floating gate electrode, and stores information due to a difference between the threshold voltages. Each memory cell transistor can be set in states having at least two different threshold voltages and has a configuration which can store so-called multi-level data. A control circuit including a sense amplifier, a potential generating circuit, and the like of the memory 6 has a configuration which can write multi-bit data in the memory cell transistor and read multi-bit data.

Control gate electrodes of the memory cell transistors belonging to the same row are connected to the same word line. Selection gate transistors are arranged at both ends of the memory cell transistors belonging to the same column and connected in series with each other. One selection gate transistor is connected to a bit line. According to this rule, the memory cell transistors, the selection gate transistors, the word line, and the bit line are arranged. Data writing and reading are performed in units of sets of a plurality of memory cell transistors, and a storage area constituted by a set of the memory cell transistors corresponds to one page.

In the example in FIG. 3, each page PG has 2112 bytes ((512 bytes of a data storage unit×4)+(10 bytes of a redundant unit×4)+(24 bytes of a management data storage unit)), and each block BLK is constituted by, for example, 128 pages.

The page buffer 32 inputs and outputs data to/from the memory 6 and temporarily holds the data. The size of data which can be held by the page buffer 32 is, for example, 2112 bytes (2048 bytes+64 bytes), like the size of the page PG. In a page write or the like, the page buffer 32 inputs and outputs data to/from the memory 6 in a unit of one page corresponding to the storage capacity of the memory 6. Data is erased in units of physical blocks BLK.

The memory 6 has a mode which writes 1-bit data in one memory cell transistor and a mode which writes multi-bit data, i.e., $2^n$- (n is a natural number) level. The mode which writes 1-bit data in one memory cell transistor is called a single-level mode, and the mode which writes multi-bit data is called a multi-level mode.

[1-2-2] Write Mode for Memory

The single-level mode and the multi-level mode will be described below with reference to FIG. 4. FIG. 4 is a diagram showing a difference between the single-level mode and the multi-level mode. As described above, each memory cell transistor of the memory 6 can store data of at least two bits. More specifically, $2^n$-level data (n is a natural number) is stored. More specifically, in the following explanation, a 4-level mode will be described as an example of the multi-level mode. In FIG. 4, the abscissa indicates a threshold voltage Vth, and the ordinate denotes a probability of existence of the memory cell.

First, the four-level mode will be described. As shown in FIG. 4, the memory cell transistor can store any one of four data, for example, "11", "01", "10", and "00" in an ascending order of the threshold value depending on the magnitude of the threshold voltage Vth. The threshold voltage Vth [V] of the memory cell transistor which stores the data "11" satisfies Vth<0. The threshold voltage Vth [V] of the memory cell transistor which stores the data "01" satisfies 0<Vth<Vth1. The threshold voltage Vth [V] of the memory cell transistor which stores the data "10" satisfies Vth1<Vth<Vth2. The threshold voltage Vth [V] of the memory cell transistor which stores the data "00" satisfies Vth2<Vth<Vth3.

Next, the single-level mode will be described. As shown in FIG. 4, the memory transistor can store any one of two data, "1" and "0", in an ascending order of the threshold voltage depending on the magnitude of the threshold voltage Vth. The threshold voltage Vth [V] of the memory cell transistor which stores the data "1" satisfies Vth<0. The threshold voltage Vth [V] of the memory cell transistor which stores the data "0" satisfies Vth1<Vth<Vth2.

The data "1" has a threshold value equal to that of the data "11" in the four-level mode, and the data "0" data has a threshold voltage equal to that of the data "10" in the four-level data. More specifically, it can be said that the single-level mode is an operation mode using only a low-order bit of 2-bit data in the 4-level mode. The memory 6 writes data in the memory cell transistor in the single-level mode or writes data in the memory cell transistor in the 4-level mode according to a designation from the controller 7. More specifically, a low-order page address is allocated to a low-order bit of 2-bit data, and a high-order page address is allocated to the high-order bit. When data is to be written in the memory cell transistor in the single-level mode, the controller 7 writes the data in the memory 6 by using only the low-order page address of the page addresses. When data is to be written in the memory cell transistor in the multi-level mode, the controller 7 writes the data in the memory 6 by using both the high-order page address and the low-order page address.

Data is written from a low-order bit. When it is assumed that an erase state is represented by "11", "0" or "1" is written at a low-order bit to set a state in which the memory cell transistor holds "11" ("–1") or "10" ("–0"). Here, "–" means indefiniteness. In the single-level mode, this is the end of the write operation.

On the other hand, when data is written in the 4-level mode, subsequently "0" or "1" is written at the high-order bit. As a result, the memory cell transistor which held "11" ("–1) is set in a state in which "11" or "01" is held, and the memory cell transistor which held "10" ("–0") is set in a state in which "10" or "00" is held. In an 8-level mode and a 16-level mode, the same operation as described above is performed.

In the multi-level mode, although the amount data storable per memory cell is large, a write speed is low. On the other hand, in the single-level mode, although the amount of data storable per memory cell is small, a write speed is high, and resistance to a rewrite frequency is also high.

The memory 6 can select write in the single-level mode or write in the multi-level mode in units of physical blocks.

The mode may be extended to not only the 4-level mode but also an 8-level mode (3 bits per memory cell) or a 16-level mode (4 bits per memory cell). In any case, when the number of bits per memory cell is small, a write speed becomes high, and resistance to a rewrite frequency is also high.

[1-2-3] Logical Format of Memory Card

Next, a format of the memory card 2 will be described. The memory 6 is formatted in the following format. This format is performed by a file system (for example, the file system 4 in the host 1) according to an embodiment of the invention.

[1-2-3-1] FAT File System

Figure 5:
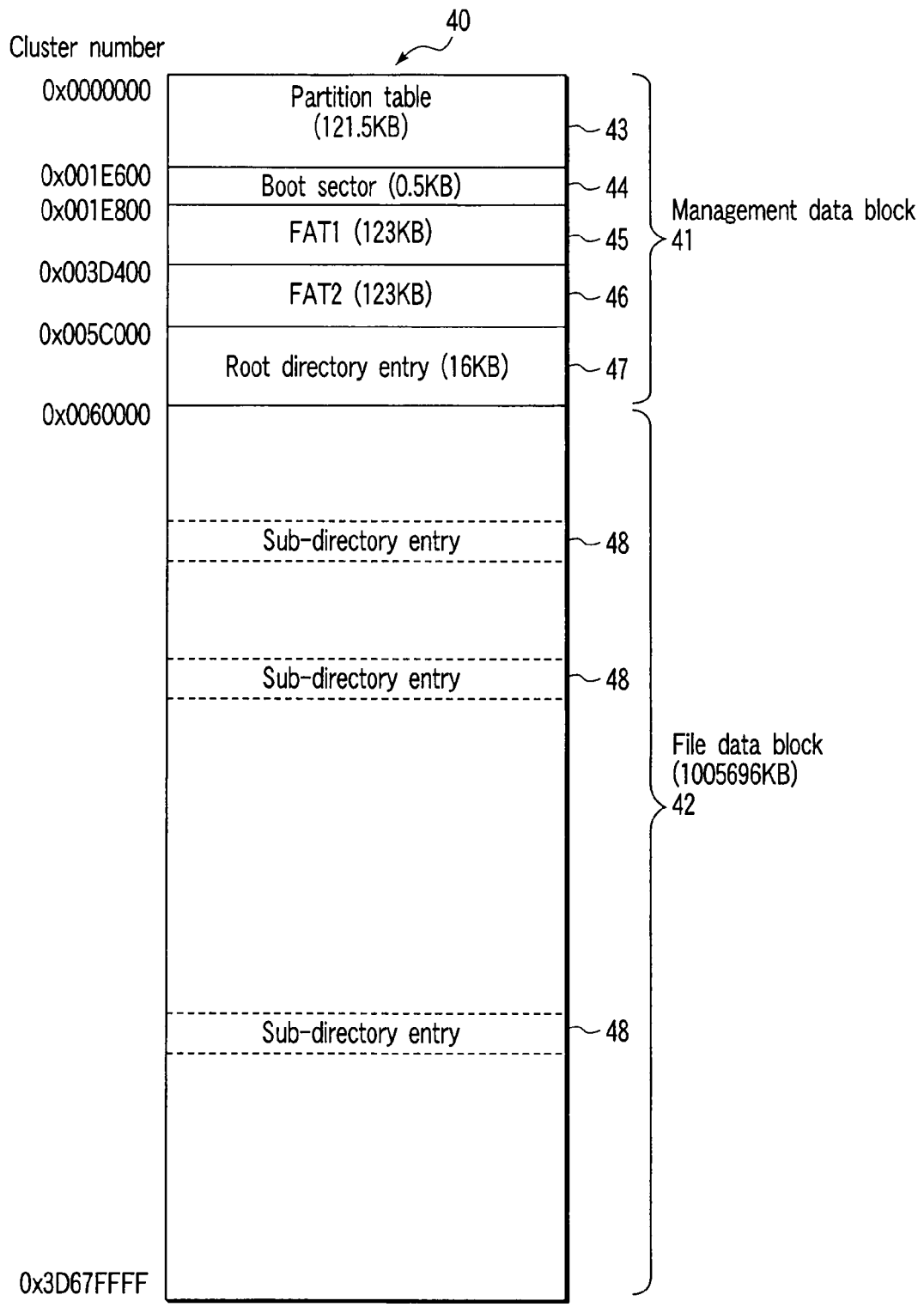
FIG. 5 is a diagram showing a memory space formatted by a FAT file system.

Prior to an explanation of a format of the memory 6 by the file system according to an embodiment of the invention, an outline of the FAT file system on which the file system is based will be described with reference to FIGS. 5 and 6. FIG. 5 shows a state of a memory space formatted by the FAT file system. Several management data described below are written. The memory space mentioned here is a memory area which the FAT file system can freely access. In the memory 6 in FIG. 1, the memory area corresponds to the user data area 24.

As shown in FIG. 5, in the FAT file system, a memory space of a memory to be managed is divided into clusters each having a certain size (for example, 16 kbytes) and managed. Management data is allocated to an area of a cluster number in a predetermined range from the lowest level of a memory space 40. An area which stores the management data is called a management data block 41. File data is allocated to an area of a cluster number having a level higher than that of the management data block 41. An area which stores the file data is called a file data block 42.

The management data block 41 is further divided into an area 43 allocated to a partition table, an area 44 allocated to a boot sector, areas 45 and 46 allocated to FAT1 and FAT2, respectively, and an area 47 allocated to a root directory entry. The partition table stores information such as a file system type of each partition and a start sector of the partition. The boot sector is located at a start sector indicated by the partition table and includes a BIOS parameter block (BPB). The BPB denotes various parameters of the memory 6 used by the file system. The FAT file system writes the parameters when the memory is formatted. On start-up, the BPB is written to recognize the parameters of the file format.

The FAT1 denotes a specific cluster in which a part (to be simply referred to as file data hereinafter) of the file data divided into data each having the certain cluster size, and association of clusters for recovering the file data. The FAT2 is a backup of the FAT1 and stores the same contents as those of the FAT1.

Since each file data constituting one file is not necessarily allocated to series clusters, the FAT file system allocates an idle cluster to file data without regarding an order of cluster numbers (at random). The FAT1 and FAT2 store a connection relation of clusters storing file data. Information stored in the FAT1 and the FAT2 (to be simply referred to as "FAT" hereinafter) is traced to recover the original file.

The root directory entry stores a file entry of each file belonging to a root directory. The file entry includes a file name or a folder name, a file size, an attribute, updating date information of a file, a flag representing a specific cluster serving as a start cluster of a file, and the like. Depending on a version (for example, FAT16 or FAT32) of a FAT format type, a route directory entry can be put at an arbitrary address after the FAT.

When a certain file belongs to a sub-directory belonging to a root directory, a number of a cluster allocated to an entry (sub-directory entry) of the sub-directory belonging to the root directory is described in the root directory entry. The sub-directory entry holds a file entry of each file belonging to the sub-directory entry. As shown in FIG. 5, the sub-directory entry is written in an arbitrary cluster 48 in the file data block 42 by the FAT file system. The sub-directory entry belongs to management data and is frequently rewritten.

Figure 6:
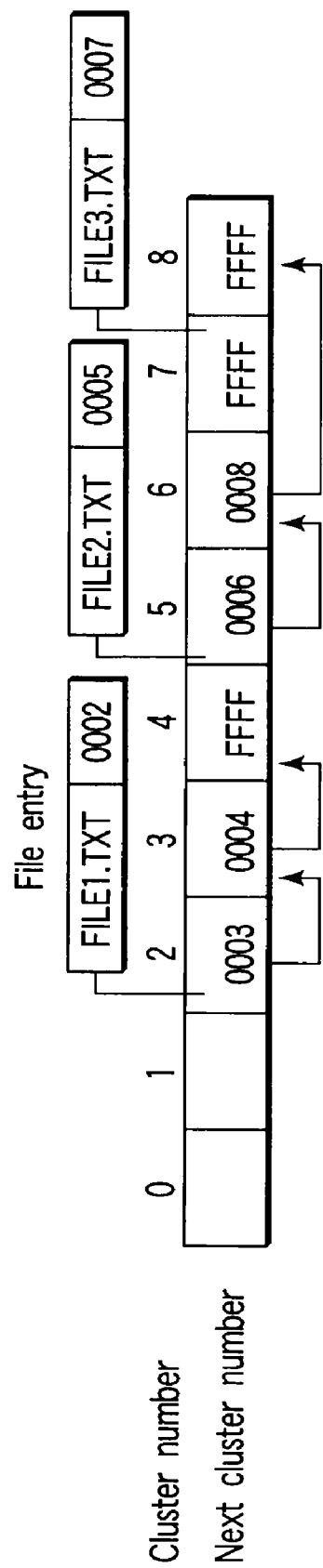
FIG. 6 is a diagram showing an example of data held by a FAT.

FIG. 6 shows an example of a FAT and a file entry. As shown in FIG. 6, the root directory entry stores position information of start clusters of files "FILE1.txt", "FILE2.txt", and "FILE3.txt" as a file entry. The start clusters of the files "FILE1.txt", "FILE2.txt", and "FILE3.txt" are clusters 0002, 0005, and 0007, respectively.

In the FAT, a number of a cluster to be connected next to each cluster is described. For example, when "FILE1.txt" is used, it is understood that a cluster in which data subsequent to the data of the start cluster 0002 is stored is the cluster 0003 and that a cluster in which data subsequent to the data of the cluster 0003 is stored is the cluster 0004. The data of the clusters 0002, 0003, and 0004 are connected to recover the file of the file "FILE1.txt". "FFFF" is written in a cluster in which a final part of the file data is stored.

[1-2-3-2] File System According to Embodiment of Present Invention

A file system according to an embodiment of the invention based on a FAT file system will be described below with reference to FIG. 7. A file system (also corresponding to the file system 4 in the host 1 hereinafter) formats a memory space of a storage medium in the following form. The memory card 2 is formatted by the file system 4.

Figure 7:
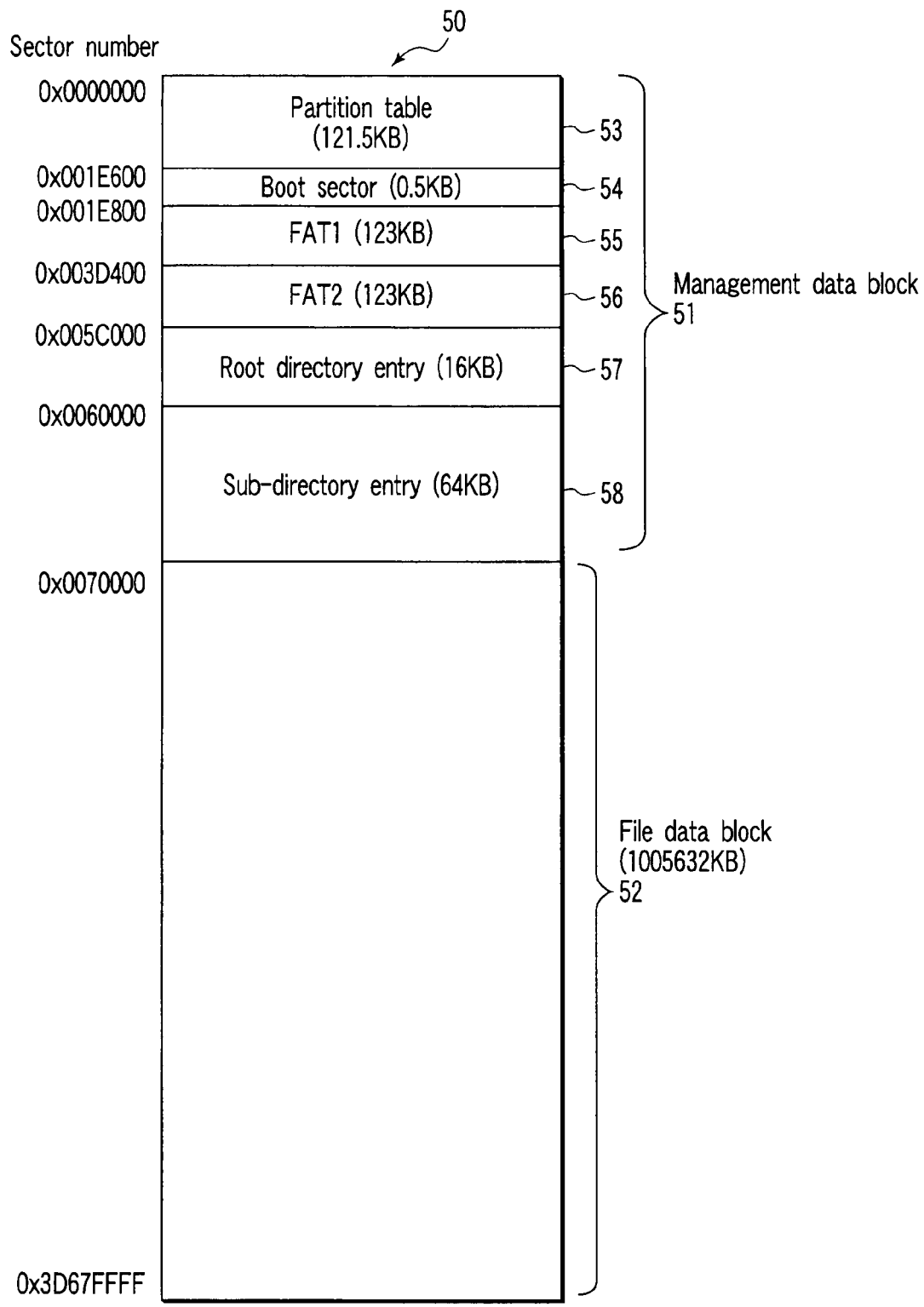
FIG. 7 is a diagram showing a memory space formatted by a file system.

FIG. 7 shows a memory space formatted by the file system 4 according to the embodiment of the invention. A memory space 50 shown in FIG. 7 coincides with an area which can be used by the file system 4 in the storage area of a storage medium to be formatted.

As shown in FIG. 7, the file system 4 limits an area to which management data used to manage file data by the file system 4 is allocated to a logical address of a predetermined range from the lowest-order logical address. More specifically, only the logical address in the predetermined range is allocated to the management data. In this case, the management data includes a partition table, a boot sector, FAT1, FAT2, a root directory entry, and a sub-directory entry which are the same as those used in the FAT file system.

A block (management data block 51) in which management data is stored includes an area 53 allocated to a partition table, an area 54 allocated to a boot sector, areas 55 and 56 allocated to FAT1 and FAT2, respectively, an area 57 allocated to the root directory entry, and an area 58 allocated to a sub-directory entry. Data stored in the blocks 53 to 58 are the same as those defined by a conventional FAT file system.

A part of the memory space 50 except for the management data block 51 is a file data block 52 dedicated to write file data. The capacity of the management data block 51 is determined in consideration of a size of the memory space 50 and a size of the file data block 52 required to be assured. For example, the capacities of the partition table area 53, the boot sector area 54, the FAT1 area 55, the FAT2 area 56, the root directory entry area 57, and the sub-directory entry area 58 are 121.5 kB, 0.5 kB, 123 kB, 123 kB, 16 kB, and 64 kB, respectively. The capacity of the file data block 52 is 1005632 kb.

The file system 4 is based on the FAT file system (regardless of a difference between FAT16, FAT32, and the like). Not only the FAT file system, but also a similar file system including an extension of the FAT can also be used. For example, the file system corresponds to a file system in which file data is managed by using management data and management data is frequently rewritten.

The memory card 2 according to an embodiment of the invention is formatted by the file system 4. Therefore, the memory 6 is formatted as shown in FIG. 7.

[1-2-4] Relationship Among Management Data Block, File Data Block, and Write Scheme A relationship among the management data block 51, the file data block 52, and a write scheme will be described below with reference to FIG. 8.

Figure 8:
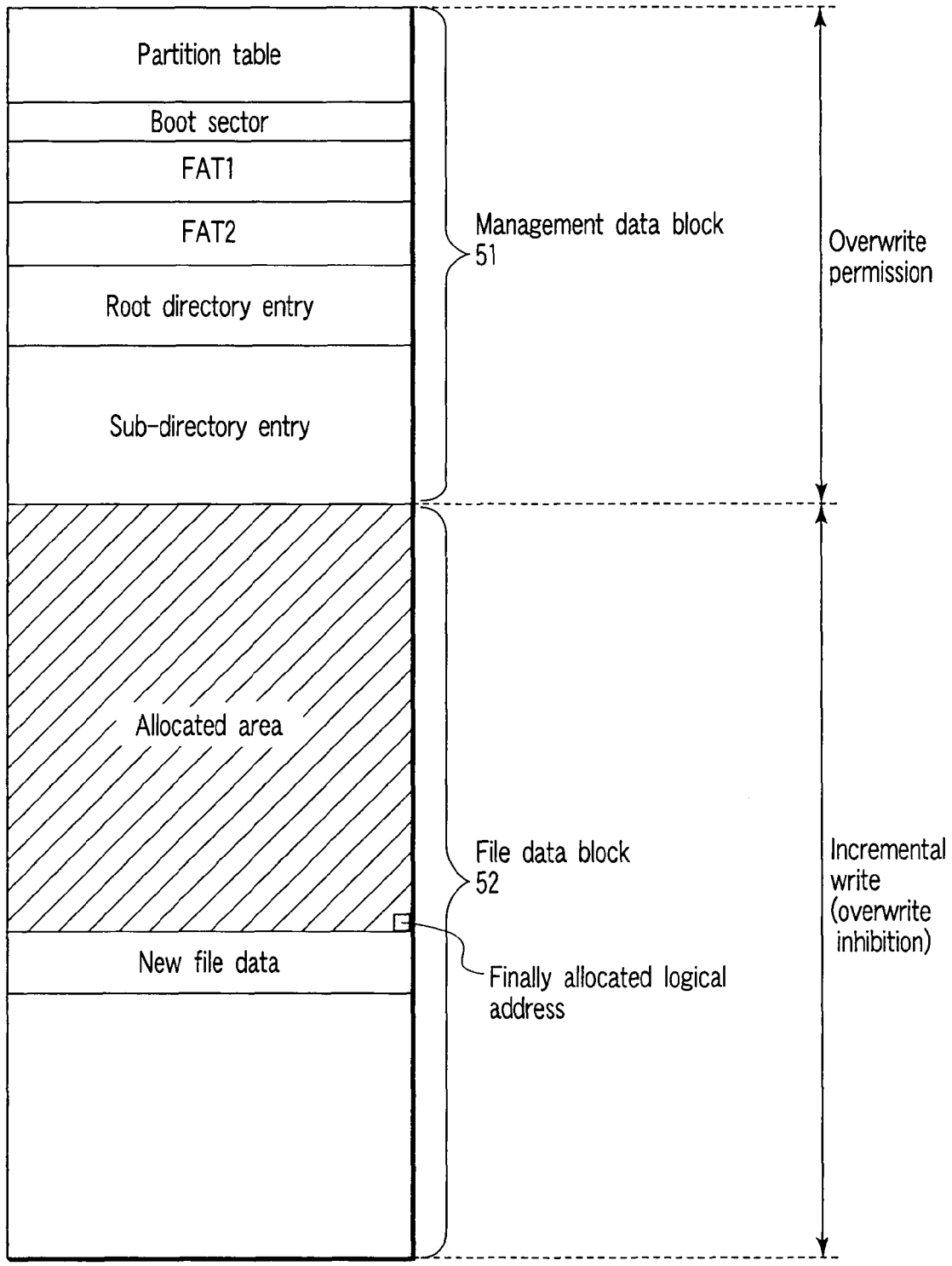
FIG. 8 is a diagram showing a correspondence among a management data block, a file data block and a write scheme.

FIG. 8 is a diagram showing a correspondence among the management data block 51, the file data block 52, and the write scheme. As shown in FIG. 8, when the controller 7 receives an updating request to a logical address belonging to the management data block 51, overwrite is performed. In this case, the "overwrite" is a write scheme which can allocate a logical address to which data has been allocated to another piece of data. In the following explanation, it is assumed that the logical address belonging to the management data block 51 is called an overwrite logical address. Since the memory 6 is a NAND flash memory, data written in the memory 6 cannot be rewritten in the memory 6. For this reason, as needed, a configuration called a following cache physical block (cache block) can be used.

Data to which overwrite logical address is allocated is management data, and is frequently updated. Accordingly, in order to write data at a high speed for frequent updating, a block called a cache block and dedicated to write once may be formed in the memory 6. The cache block is added to a physical block (original block) in which data of each logical address is originally written.

Data at a predetermined logical address is written in the same original block. Each time a request for updating written data is received by the original block, the data is sequentially written in an idle page in the cache block from a low-order physical address to a high-order address. At this time, the memory card 2 forms a corresponding table showing a specific page of the cache block on which the latest data of the certain logical address is written in advance. As a consequence, even though an updating request is generated to a certain logical address, high-speed write can be realized without a moving process. When the cache block is used, i.e., with respect to overwrite logical address, a correspondence of a logical address of one sector to a physical address of one page is managed.

When the file data has a small capacity, overwrite logical address can be allocated to the file data.

On the other hand, the controller 7 inhibits data to which a logical address belonging to the file data block 52 is allocated from being overwritten, and only permits the data to be written once. The "incremental write" is a scheme which allocates a logical address having an order higher than that of the logical address to which data has been allocated to write data. More specifically, the controller 7 accepts a write request only when a logical address having an order higher than that of an allocated logical address is allocated. In response to a write request which does not satisfy this condition, the controller 7 does not perform write and transmits a status representing a write protect error to the host 1. The logical address belonging to the file data block 52 will be called an incremental write logical address hereinafter.

With respect to data to which an incremental write logical address is allocated, one physical block is allocated to, for example, a set (to be referred to as a logical block) of a predetermined number of logical addresses. Accordingly, with respect to the incremental write logical address, a correspondence of an address (allocated to each logical block) of a logical block to an address of a physical block is managed. The logical block has the same size as that of, for example, a physical block.

When file data is updated, a file system 10 requests the memory card 2 to write a file data to which a logical address having an order higher than that of the allocated logical address and update management data.

Information representing a range of logical address, for example, the highest-order logical address is written in the system data area 21. The information of highest-order logical address is written when the memory card 2 is formatted. A boundary between overwrite logical address and the incremental write logical address can be indicated by using the lowest-order incremental write logical address.

[1-2-5] Correspondence of Write Scheme to Write Mode

Figure 9:
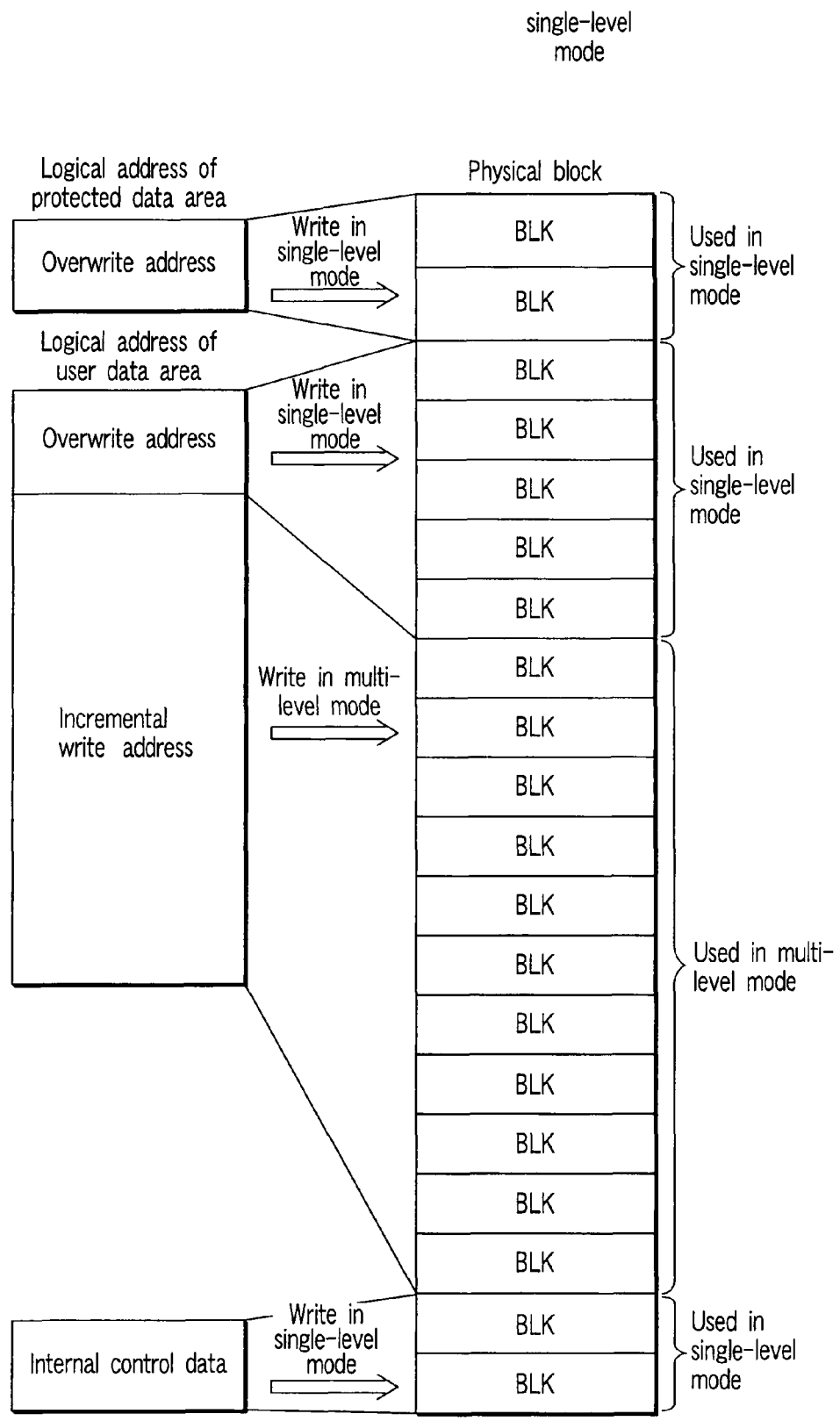
FIG. 9 is a diagram showing a correspondence between a controller write scheme and a write mode.

A correspondence of a write scheme to a write mode will be described below with reference to FIG. 9. FIG. 9 shows a correspondence of a write scheme to a write mode in a controller according to an embodiment of the invention.

As shown in FIG. 9, the controller 7 can write data to which an overwrite logical address is allocated in the memory 6 in a single-level mode and write data to which an incremental write logical address is allocated in the memory 6 in a multi-level mode. Therefore, management data having a small capacity and required to be frequently updated is written in the single-level mode which can cope with a small capacity, can perform high-speed write, and has high resistance to frequent rewrite. File data having a large capacity can be written in the multi-level mode which can cope with a large capacity and low-speed write. In this manner, the write mode is selected depending on the characteristics of data to make it possible to write data in the memory card 2 at a high speed and to assure a large storage capacity. More commonly, management data is written such that one memory cell stores m-bit (m is an integer of 1 or more) data. The file data can be written such that one memory cell stores n-bit (n is an integer given by n>m) data.

Physical blocks may be classified into blocks for single-level mode write and blocks for multi-level mode write. More specifically, the controller 7 uses physical blocks included in a range from, for example, the lowest-order physical address to a predetermined boundary for write in the single-level mode, and physical blocks included in a range from the boundary to the highest-order physical address can be used for write in the multi-level mode.

In write in the multi-level mode, a physical block for the single-level mode can also be used as a buffer 32. As described above, the controller 7 writes control data in the user data area 24. The controller 7 also writes control data in the physical block in the single-level mode and may perform overwrite.

As described above, the protected data area 23 and the user data area 24 are logically formatted as independent volumes from the host 1. The protected data area 23 generally has a small capacity, and file data to be written in the protected data area 23 is frequently updated. The controller 7 writes data in the protected data area 23 in the single-level mode and also permits overwrite. Similarly, in the system data area 21 and the secret data area 22, data are written in the single-level mode, and overwrite is permitted.

As described above, the protected data area 23 and the user data area 24 do not belong to independent values, respectively, and a configuration in which the protected data area 23 and the user data area 24 alternately belong to different partitions may be conceived. In this case, it is possible to employ a method of applying any one of a conventional file system in which all data are permitted to be overwritten and a file system according to the embodiment of the invention in which only management data is permitted to be overwritten to each partition.

[1-3] Configuration of SD Interface

A configuration of an SD interface will be described below with reference to FIGS. 10 to 16.

[1-3-1] Method of Giving and Receiving Finally Allocated Logical Address

Figure 10:
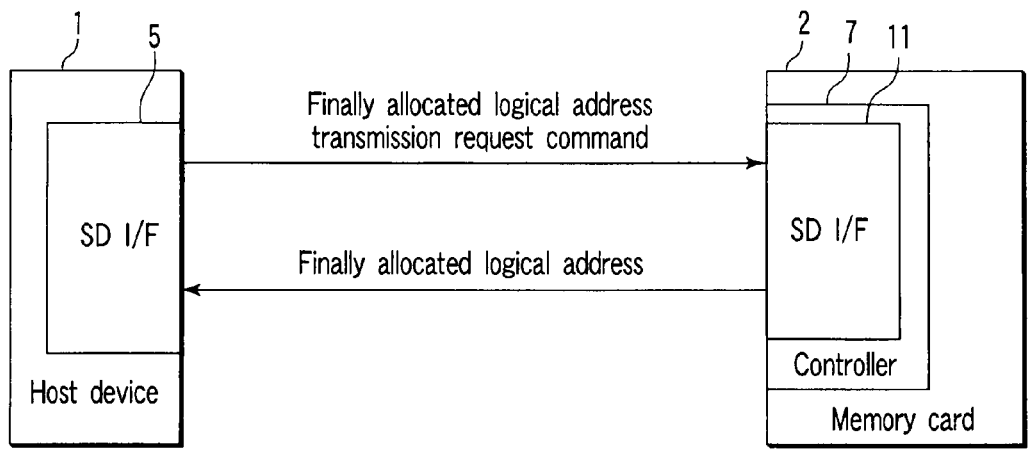
FIG. 10 is a diagram showing a configuration to give and receive a finally allocated logical address.
Figure 11:
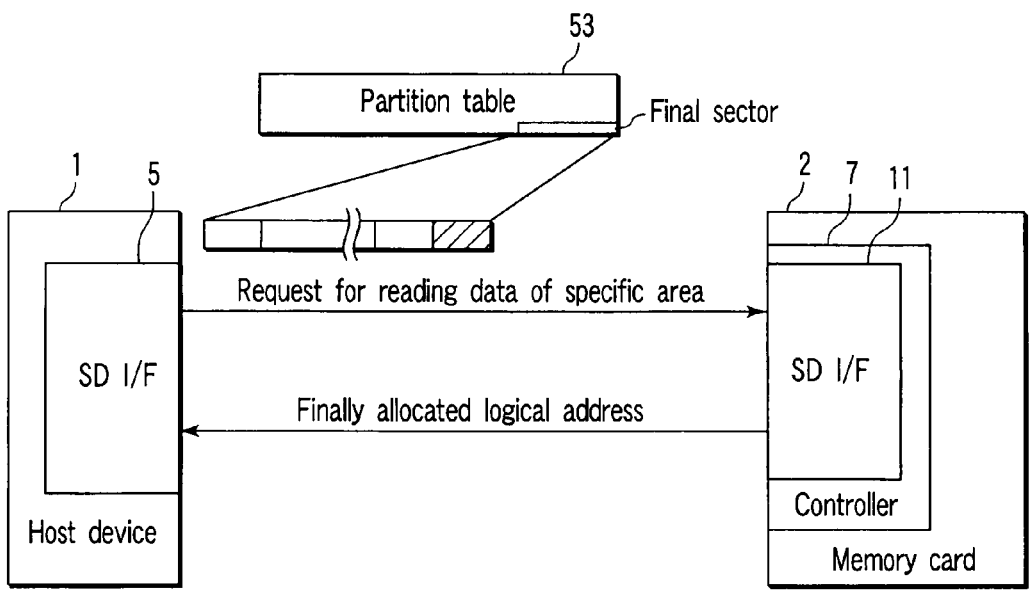
FIG. 11 is a diagram showing a configuration to give and receive a finally allocated logical address.

The host 1 (file system 4) must acquire a logical address (finally allocated logical address) finally allocated to write file data by an incremental write scheme. Therefore, a command to give and receive the finally allocated logical address is set in the SD interfaces 5 and 11. FIGS. 10 and 11 are diagrams showing a configuration to give and receive the finally allocated logical address.

The controller 7, as will be described later, in a write state, a finally allocated logical address is written on the RAM 14.

As shown in FIG. 10, the host 1 issues a command which requests transmission of a finally allocated logical command to the controller 7. When the controller 7 receives the command, the controller 7 transmits the finally allocated logical address stored on the RAM 14 to the host 1 as a response. The host 1 acquires the finally allocated logical address by the response. The host 1 starts allocation from the logical address next to the above logical address, and performs incremental write recording to the memory card 2.

In place of a dedicated command, the following method can be used. More specifically, as shown in FIG. 11, when the controller 7 receives a request for reading a specific logical address, the controller 7 transmits the finally allocated logical address to the host 1 as read data. An example of the specific logical address is the last 8 bytes in the final sector of the partition table block 53. According to this method, when the memory card 2 is used through a universal serial bus (USB) reader/writer (RW) having conventional specifications which do not support a new command, data can be read from the memory card 2 of the finally written logical address by using software on a personal computer (PC) in which the USB RW is inserted.

[1-3-2] Method of Performing Authentication of Permission of Data Write

Figure 12:
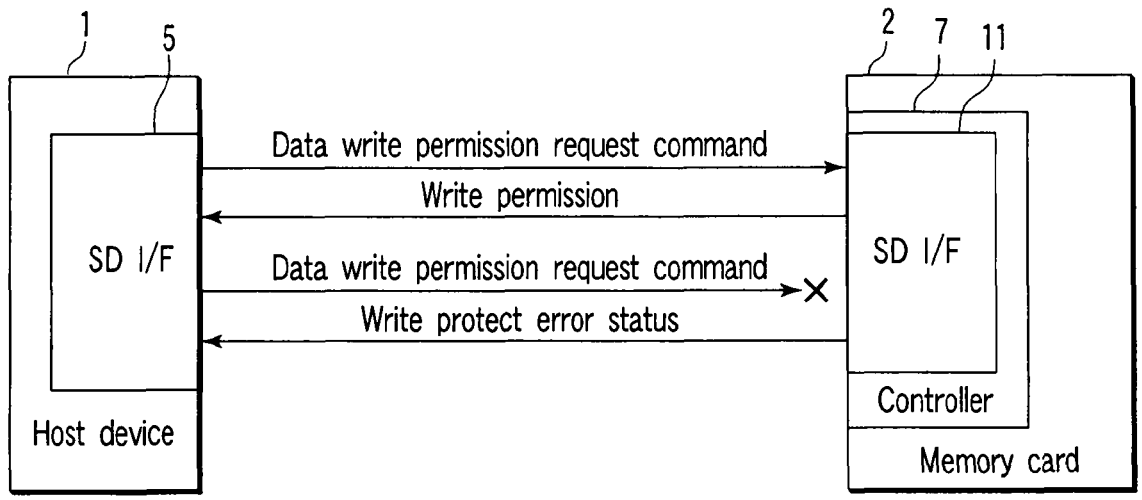
FIG. 12 is a diagram showing a configuration to perform authentication of data write permission.
Figure 13:
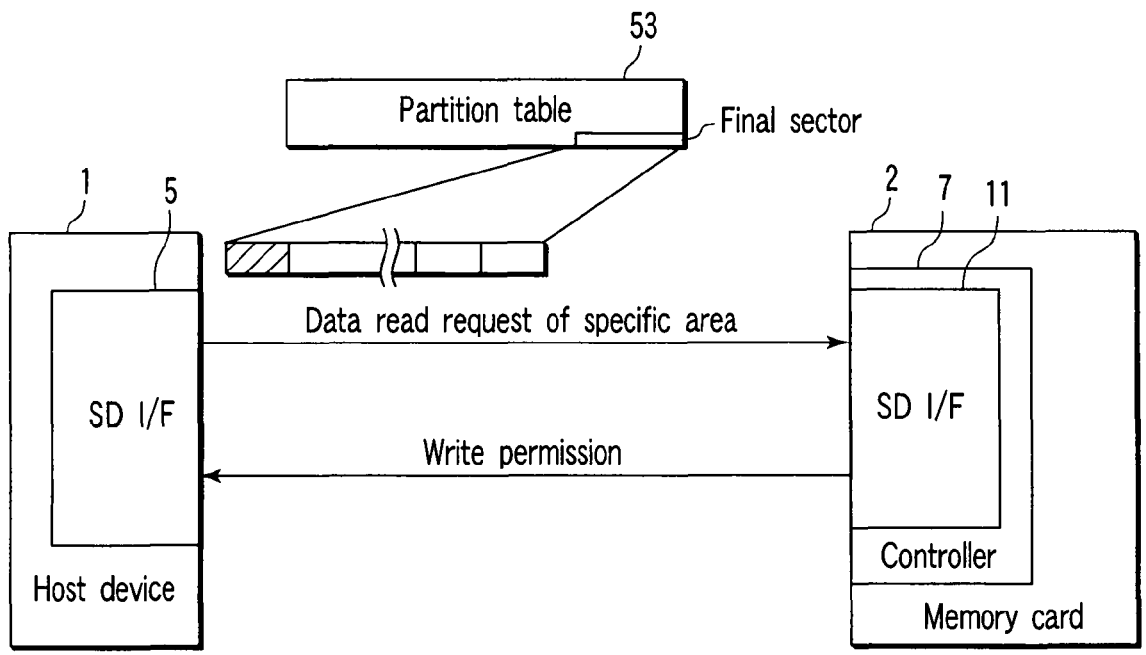
FIG. 13 is a diagram showing a configuration to perform authentication of data write permission.

When data is written in the memory card 2 according to an embodiment of the invention through a conventional file system, ununiformity occurs in management data. As a result, the content of the file may be destroyed. Commands to perform authentication of write to the memory card 2 are set in the SD interface 5 and the SD interface 11, respectively. FIGS. 12 and 13 are diagrams showing a configuration to perform authentication of permission to write data.

As shown in FIG. 12, the controller 7 waits for transmission of a data write permission request command from the host 1 after initialization. When the controller 7 receives the command, the host 1 supports the command. That is, since the host 1 includes the file system 4 according to an embodiment of the invention, the memory card 2 accepts the write request.

When the controller 7 does not receive the data write permission request command, on the other hand, the controller 7 always returns a write protect error signal in response to the write request from the host 1. According to this technique, the data of the memory card 2 is avoided from being destroyed by a file system other than the file system 4 according to an embodiment of the invention.

In place of setting of a dedicated command, the following method can be used. More specifically, as shown in FIG. 13, when the controller 7 receives a request for writing specific data to a specific logical address, the memory card 2 subsequently accepts write requests from the host. An example of the specific logical address is the first 8 bytes in the final sector of the partition table block 53. An example of the specific data may be at least one of 0x01, 0x23, 0x45, 0x67, 0x89, 0xAB, 0xCD, and 0xEF. According to the method, even though the memory card 2 is used through a USB RW having conventional specifications which do not support a new command, data can be written in the memory card 2 through software on a PC in which the USB RW is inserted.

[1-3-3] Method of Acquiring Range of Overwrite Logical Address by Host

Figure 14:
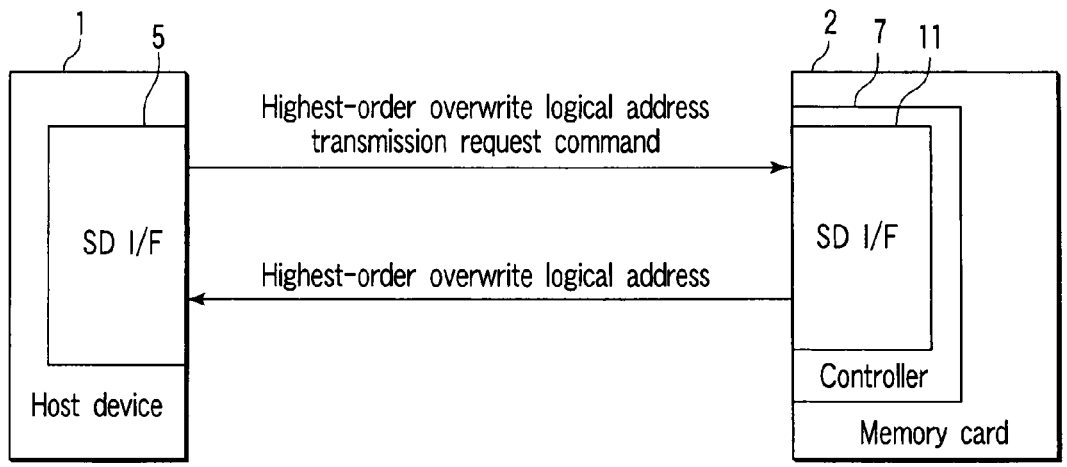
FIG. 14 is a diagram showing a configuration to cause a host to acquire a highest-order overwrite type logical address.
Figure 15:
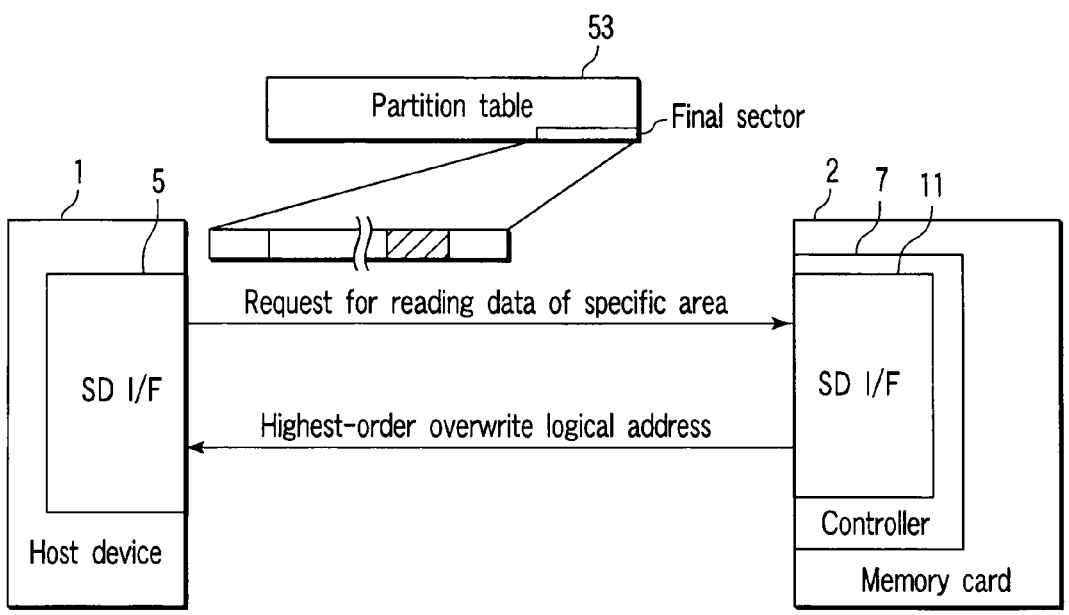
FIG. 15 is a diagram showing a configuration to cause a host to acquire a highest-order overwrite type logical address.

The host (file system 4) must acquire a boundary between overwrite logical address and an incremental write logical address. For this reason, commands to give and receive the highest-order overwrite logical address are ["set"?] in the SD interfaces 5 and 11, respectively. FIGS. 14 and 15 are diagrams showing a configuration to acquire the highest-order overwrite logical address by a host. As a method of acquiring the boundary between the overwrite logical address and the incremental write logical address, a lowest-order incremental write logical address may be also used in place of the highest-order overwrite logical address to perform the following process.

As shown in FIG. 14, the host 1 issues a command which requests transmission of the highest-order overwrite logical address to the controller 7. Upon receipt of the command, the controller 7 transmits the highest-order logical overwrite logical address stored in the system data area 21 to the host 1 as a response.

The host 1 can know the range of overwrite logical address by using the command. The file system 10 of the host 1 refers to the highest-order overwrite logical address to form a new file or a new directory entry at a logical address having an order lower than the highest-order overwrite logical address, i.e., overwrite logical address.

In place of setting of a dedicated command, the following method can be used. More specifically, as shown in FIG. 15, when the controller 7 receives a request for reading a specific logical address, the controller 7 transmits the highest-order overwrite logical address to the host 1 as a read data. An example of the specific logical address is the last second 8 bytes in the final sector of the partition table block 53. According to this method, even though the memory card 2 is used through a USB RW having conventional specifications which do not support a new command, data can be read from the memory card 2 of the highest-order overwrite logical address by using software on a PC in which the USB RW is inserted.

[3-4] Card Type Flag

Figures 16, 17:
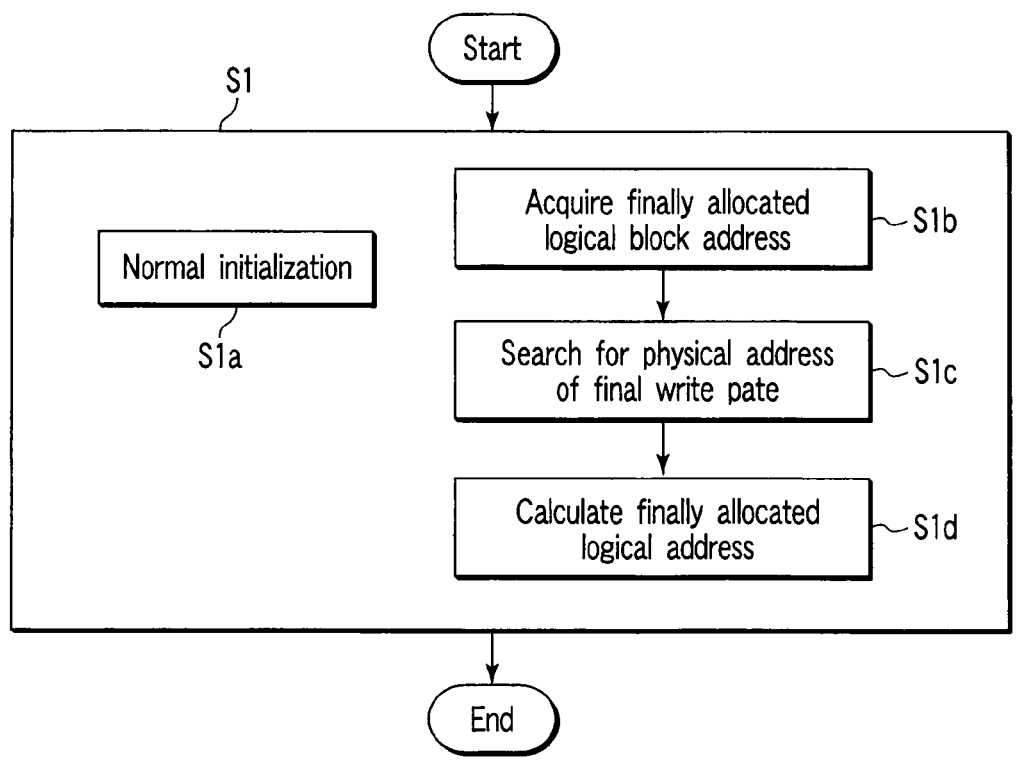
FIG. 16 is a diagram showing an example of the details of a register CSD.
FIG. 17 is a flow chart of initialization of a memory card.

A flag representing a type of the memory card 2 and a write scheme depending on the type is described in a register CSD of the register 15. FIG. 16 shows an example of the details of the register CSD.

As shown in FIG. 16, three areas are defined in addition to an area which is conventionally defined by the register CSD (by using an undefined area). FIG. 16 shows an example in which 0th to fourth bits have been defined and newly defined bits CT, OW, and FC are set as fifth, sixth, and seventh bits, respectively.

The bit CT (register CT) represents a limitation of allocation of a logical address to management data. For example, "0" represents that, in a write state to the memory card 2, any logical address may be allocated to the management data (especially, a directory entry). On the other hand, for example, "1" represents that, as in an embodiment of the invention, a logical address in a predetermined range must be allocated to the management data.

The bit OW (register OW) represents an overwrite limitation of file data. For example, "0" represents that overwrite of the file data is not limited. On the other hand, for example, "1" represents that, as in an embodiment of the invention, some logical addresses or the like are not permitted to be overlapped.

The bit FC (register FC) represents the presence/absence of the possibility of rewriting a FAT by the memory card 2. For the characteristic of the operation of the controller, some controller itself may rewrite the FAT after the controller writes file data. For this reason, in order to cause the file system of the host to be able to acquire whether the FAT must be read or not, the bit FC is set. For example, "0" represents that the memory card 2 need not rewrite the FAT (reread of the FAT by the file system is unnecessary). On the other hand, for example, "1" represents that the memory card 2 may rewrite the FA (reread of the FAT by the file system is necessary).

In the memory card 2 according to an embodiment of the invention, CT=1, OW=1, and FC=0.

The above bits are set to make it possible to cause the file system to easily acquire the characteristics of the memory card 2.

[2] Operation

Operations of the host 1 and the memory card 2 will be described below with reference to FIGS. 17 to 21.

[2-1] Initialization of Memory Card

An initializing operation for the memory card 2 will be described below with reference to FIG. 17. FIG. 17 is a flow chart of initialization of the memory card according to an embodiment of the invention.

The controller 7 writes several pieces of information to know an incremental write logical address up to which data is allocated in the initializing process in the memory 6 as needed. For example, when file data to which the incremental write logical address is allocated is written, the controller 7 writes file data and additionally writes a flag representing that the data write is finished in a redundant area of each page. An address of a logical block including a logical address finally allocated is stored in the system data area 21.

As shown in FIG. 17, when the controller 7 receives an initializing command at the start of power supply, the controller 7 starts an initializing process. An initializing process S1 is constituted by the same initializing process (step S1a) as that of a conventional memory card and processes (from the step S1b to step S1d) of calculating an allocated final logical address in the incremental write logical address and writing the logical address in the RAM 14.

With respect to the incremental write logical address, a only a correspondence of a logical block to a physical block is managed. Therefore, one finally allocated logical address is specified by the following method. In step S1b, the controller 7 acquires an address (finally allocated logical block address) of a logical block including the finally allocated logical address from the system data area 21.

In step S1c, the controller 7 inspects a redundant area of each page in a physical block (final write physical block) allocated to the finally allocated logical block to acquire the physical address of the finally written page. As a result, the controller 7 acquires the number of written pages in the final write physical block. In step S1d, the controller 7 acquires the finally allocated logical address by ((the number of all logical blocks of addresses having orders lower than that of the final write logical block address)×(the number of logical addresses per logical block)+the number of write pages in the final write physical block)). In step S5, the finally allocated logical address (finally allocated logical address) is written in the RAM 14.

[2-2] Write

Figure 18:
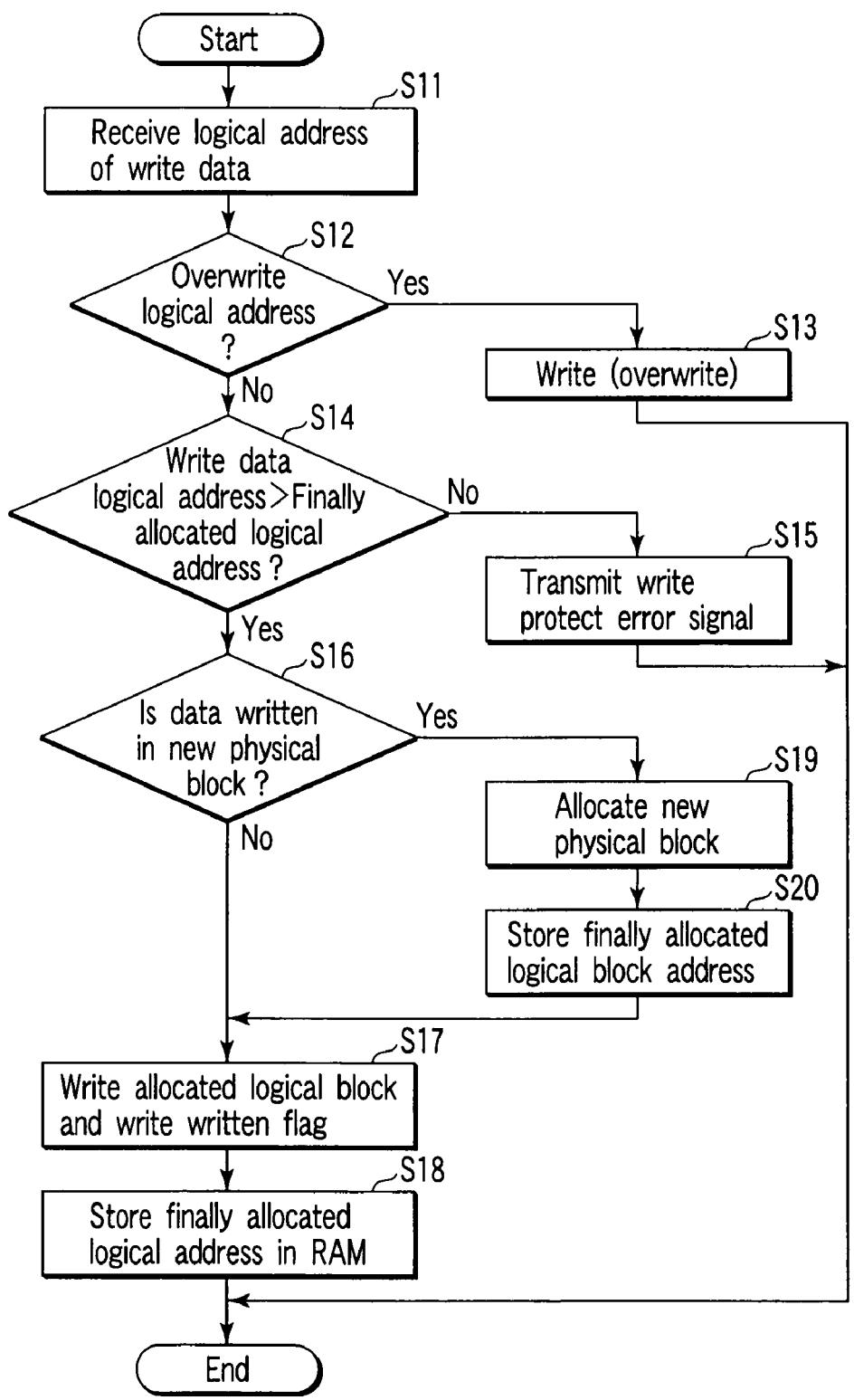
FIG. 18 is a flow chart of a write operation in the memory card.

A write operation in the memory card 2 will be described below with reference to FIG. 18. FIG. 18 is a flow chart of a write operation in a memory card according to an embodiment of the invention.

As shown in FIG. 18, in step S11, controller 7 receives a write command to which a logical address is allocated.

In step S12, the controller 7 determines whether a logical address is allocated. When the data is data to which overwrite logical address is allocated, the process shifts to step S13. In step S13, the controller 7 writes data in the memory 6. The data written in step S13 is management data, and the data is expected to be frequently overwritten. Therefore, the controller 7 performs a write process by using a cache block described in Item [1-2-4].

On the other hand, when the logical address of the write data is an incremental write logical address as a result of the determination in step S12, the process shifts to step S14. In step S14, the controller 7 refers to the RAM 14 to determine whether the logical address of the write data is larger (the order is higher) than the finally allocated logical address or not.

When the logical address of the write address does not have an order higher than that of the finally allocated logical address as a result of the determination in step S14, i.e., when an overwrite request occurs, the process shifts to step S15. In step S15, the controller 7 transmits a write protect error to the host 1, refuses to write data, and then ends the write operation.

On the other hand, when the logical address of the write data has an order higher than that of the finally allocated logical address as a result of the determination in step S14, the process shifts to step S16. The write data may be required to be written on a page in a physical block other than a physical block including the finally written page. In step S16, it is determined whether the write data should be written on a page in the physical block including the finally written page or another physical block.

Figure 19:
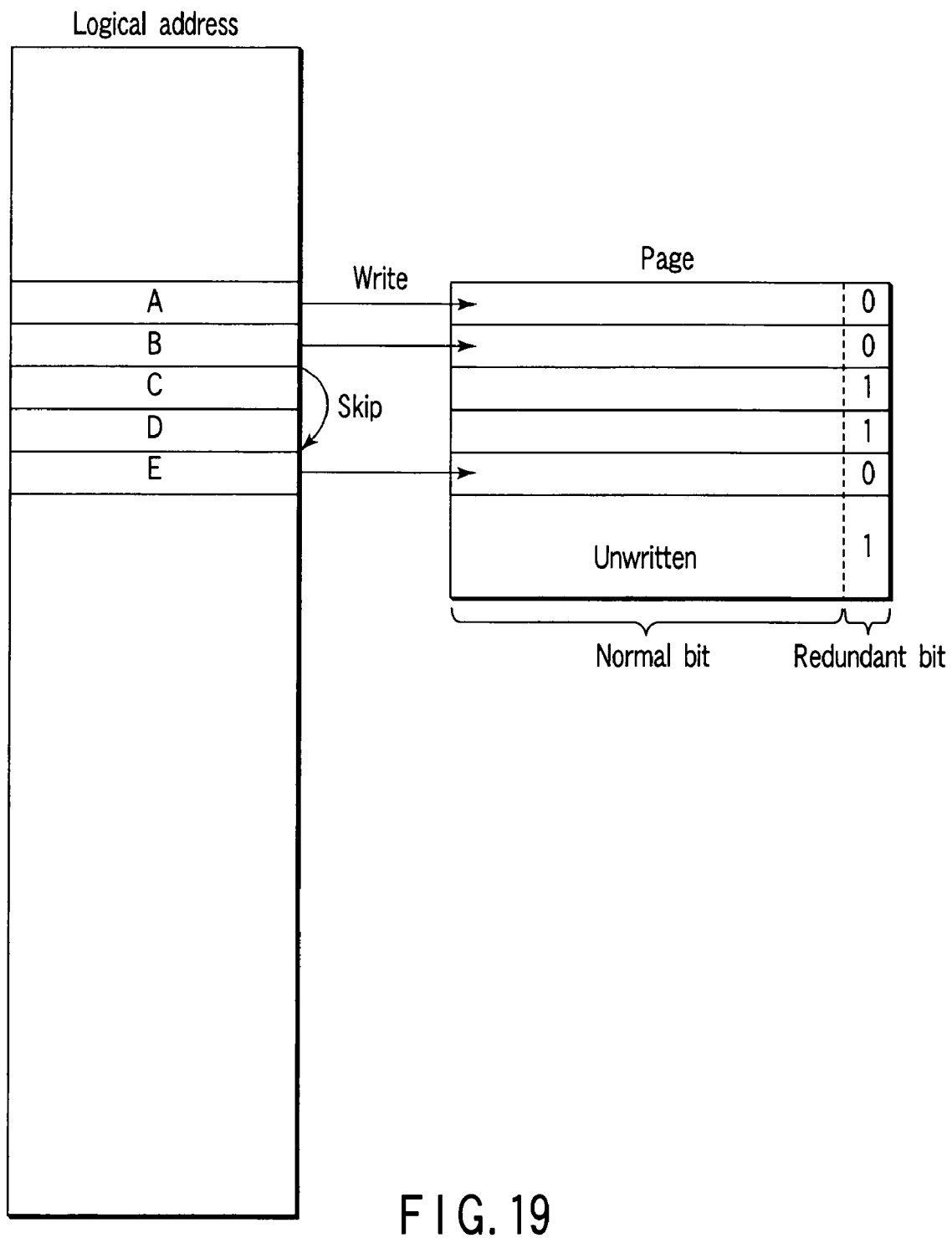
FIG. 19 is a diagram showing a result of a write process for the memory card.

When the data is written on the page in the physical block including the finally written page, the process shifts to step S17. In step S17, the controller 7 writes the write data on a page in an allocated physical block. At this time, the controller 7, as shown in FIG. 19, writes a flag (for example, "0") representing that data has been written at a bit in a redundant area of the page on which data is written. Since the write data to be written here is file data, the controller 7 can write the write data in a multi-level mode.

In step S18, the controller 7 writes the finally allocated logical address in the RAM 14.

On the other hand, in step S16, when the data is written on a page in the physical block other than the physical block including the finally allocated page, the process shifts to step S19. In step S19, the physical block in which the write data is written is allocated. In this case, when there is no erased physical block, the controller 7 erases a physical block which does not hold significant data, and the write data is written in the physical block.

In step S20, the controller 7 sets, as a finally allocated logical block address, an address of a logical address corresponding to the physical block in which the write data is written. The finally allocated logical block address is written in the memory 6 as a part of control data of the controller 7. Thereafter, the process shifts to step S17.

When the finally allocated logical address coincides with a highest-order incremental write logical address, the controller 7 replaces the finally allocated logical address with an address having an order lower than that of the lowest-order incremental write logical address by one. More specifically, a state in which data are not allocated to all incremental write logical addresses is pseudoly created. As a result, incremental write recording by the controller 7 is continued. However, since data to which incremental write logical addresses subsequent to the lowest-order logical address are allocated are held in a physical block (A) in the memory 6, the controller 7 writes, as shown in FIG. 20, the write data in a preliminary physical block (D) which is generally prepared. Thus, two physical blocks (A) and (B) are allocated to the logical block in the latest data that is written. When, upon completion of the data write in the physical block (B), write to another physical block occurs, the preliminary physical block (B) is handled as an original normal physical block, and the physical block (A) is handled as a preliminary block.

As described above, the file system 4 allocates a logical address to file data by an incremental write scheme. For this reason, in general, logical addresses of the write data are serial. However, on the contrary, some logical addresses may be skipped. An example is illustrated in shown in FIG. 19. That is, at the series of logical addresses A to E, the data to which the logical addresses A and B are allocated are written, and then, data to which the logical address E is allocated may be requested to be written. In this case, even though there are data to which logical addresses C and D are allocated, the memory card 2 secures the contents of these data. However, as described above, the logical addresses of the file data are serial in general. Therefore, a limitation that the data is not secured does not pose a serious problem. If anything, if data of a skipped logical address is secured, the memory card 2 must perform a moving process. Due to this limitation, a write speed of the memory card 2 can be avoided from being decreased without causing a serious problem.

[2-3] Allocating Operation of File System 4

Figure 21:
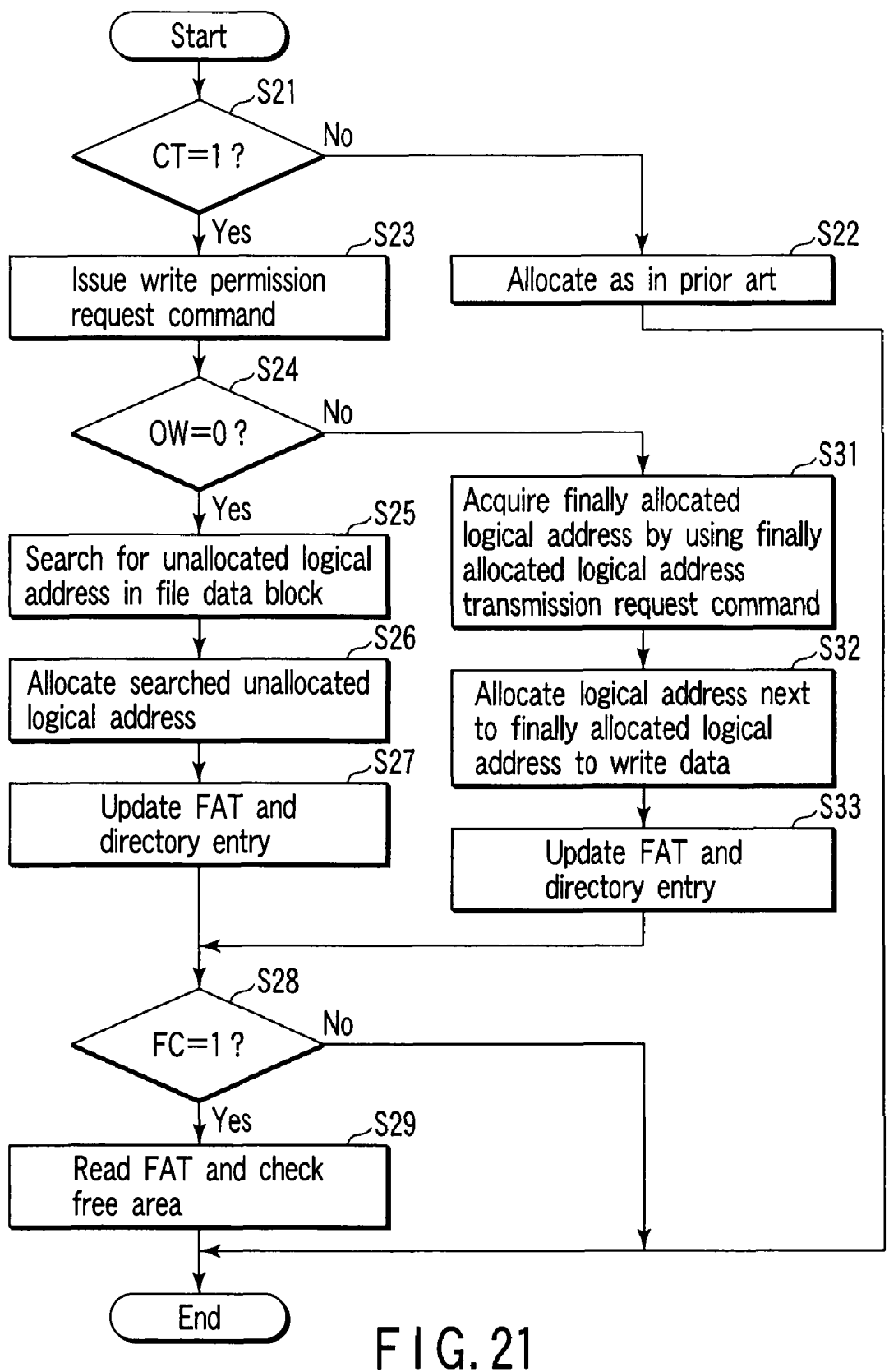
FIG. 21 is a flow chart of an allocating operation by a file system.

An operation of allocating a logical address to write data by the file system 4 will be described below with reference to FIG. 21. FIG. 21 is a flow chart showing an allocating operation by a file system according to an embodiment of the invention.

The file system 4 determines a type of the memory card 2 with reference to the register CT in step S21 when a logical address is allocated to write data. When a logical address which can be allocated to management data is not limited in the memory card 2, i.e., when a register CT1 is 0, the process shifts to step S22. In step S22, the file system 4 allocates a logical address to write data by the same method as that of the conventional FAT file system.

On the other hand, when the logical address which can be allocated to the management data is limited as a result of the determination in step S21, the process shifts to step S23. In step S23, the file system 4 issues a data write authentication command to the memory card 2 to make write valid.

In step S24, the file system 4 determines, with reference to the register CT, whether file data can be overwritten or not. When overwrite is permitted, i.e., when the register OW is 0, the process shifts to step S25.

In step S25, the file system 4 searches for an unallocated logical address. At this time, the order of logical addresses allocated to the write data, the seriality of the logical addresses, and the like are not regarded. In step S26, the file system 4 allocates the searched unallocated logical address to write data. In step S27, the file system 4 updates a FAT and a directory entry to reflect the allocated in step S26. The process then shifts to step S28.

On the other hand, when overwrite is inhibited as a result of the determination in step S24, the process shifts to step S31. In step S31, the file system 4 issues a finally allocated logical address transmission request command to the memory card 2 to acquire a finally allocated logical address. In step S32, the file system 4 allocates a logical address (and a logical address subsequent thereto) next to the finally allocated logical address to write data. In step S33, the file system 4 updates a FAT and a directory entry to reflect the allocation in step S32. The process shifts to step S28.

In step S28, the file system 4 refers to the register FC to determine whether the memory card 2 may rewrite a FAT or not. When the memory card 2 does not write the FAT, the process is ended. On the other hand, when the memory card 2 may rewrite the FAT, the file system 4 reads the content of the FAT from the memory card 2 to reflect the content on the FAT which is recognized by the file system 4. Thereafter, the process is ended.

[2-4] Read

A data read operation will be described below. The read operation is the same as that in a conventional memory card. More specifically, the host 1 supplies a read command to the memory card 2 without considering whether or not the memory card is the memory card 2 according to an embodiment of the invention. The controller 7 converts the logical address of the read data into a physical address by using a logical-physical conversion table. Data is read from a page (physical block) of a required physical block in the memory card 2 to be output to the host 1.

As described in Item [2-2], when physical blocks (A) and (B) are allocated to one logical address, read data are read from the two physical blocks as needed.

[4] Additional Configuration

A configuration which can be additionally used in the configuration described up to now will be described below with reference to FIGS. 22 to 24.

[4-1] Initializing Command to Data to which Incremental Write Address is Allocated Commands to initialize (erase) all physical blocks (incremental write logical address data storage physical blocks) which store data to which incremental write logical addresses are allocated are set in the SD interfaces 5 and 11, respectively. FIG. 22 is a flow chart showing processes of the controller 7 when the initializing command for the incremental write logical address data storage physical block is received.

Figure 22:
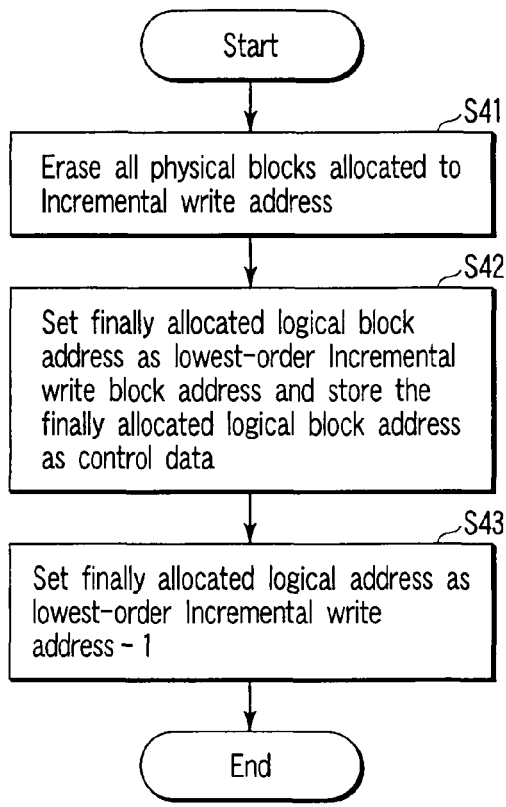
FIG. 22 is a flow chart when a command for initializing an incremental write logical address data storing physical block is received.

As shown in FIG. 22, in step S41, the controller 7, upon receipt of the command, erases all the physical blocks in which the data to which the incremental write logical addresses are allocated. When, as an embodiment, all the physical blocks are classified into physical blocks for storing data to which incremental write logical addresses are allocated and physical blocks for storing data to which overwrite logical addresses are allocated, all the physical blocks for storing the data to which the incremental write logical addresses are allocated are erased.

In step S42, the finally allocated logical block address is set as the lowest-order incremental write logical block address. The finally allocated logic block address is stored in the memory 6 as control data for the controller 7.

The controller 7 writes the finally allocated logical address in the RAM 14 as the lowest-order incremental write logical address −1.

The above processes set a state in which the incremental write address is not allocated at all.

Erasing of all physical blocks for recording data in which an incremental write logical address is allocated is not performed. That is because much time is needed for erasing of all physical blocks. Therefore, only initialization of the lowest-order incremental write logical address may be performed using an initialization command.

[4-2] Bitmap Table

Depending on a file system, a so-called cluster bitmap table may be created. The cluster bitmap table is a table showing whether clusters are allocated or not. For example, when the clusters are unallocated, "0" is described for each cluster number. When the clusters are allocated, "1" is described for each cluster number.

The cluster bit map table belongs to the management data and is frequently rewritten. As shown in FIG. 23, a logical address to be allocated to the cluster bitmap table is fixed. The controller 7 handles the logical address as overwrite logical address. The cluster bitmap table which is frequently rewritten is handled as a management table, which makes it possible to promote rationalization of a write scheme depending on the characteristics of the data.

[4-3] Method to Changing Range of Overwrite Logical Address

In the memory card 2 according to an embodiment of the invention, the number of logical addresses which can be allocated to management data is predetermined by a format in consideration of a storage capacity of the memory 6. The capacity of the logical addresses which can be allocated to the sub-directory entry is also regulated. Therefore, when the capacity of the sub-directory entry is short, a capacity (the number of overwrite logical addresses) which can be allocated to the management data may be required to be increased. Furthermore, due to functional extension of the file system 4, overwrite logical address capacity may be required to be increased. For this reason, even though a new memory card 2 is designed, the capacity of overwrite logical address can be preferably changed. Therefore, commands to change overwrite logical address capacity are set in the SD interfaces 5 and 11, respectively.

Figure 24:
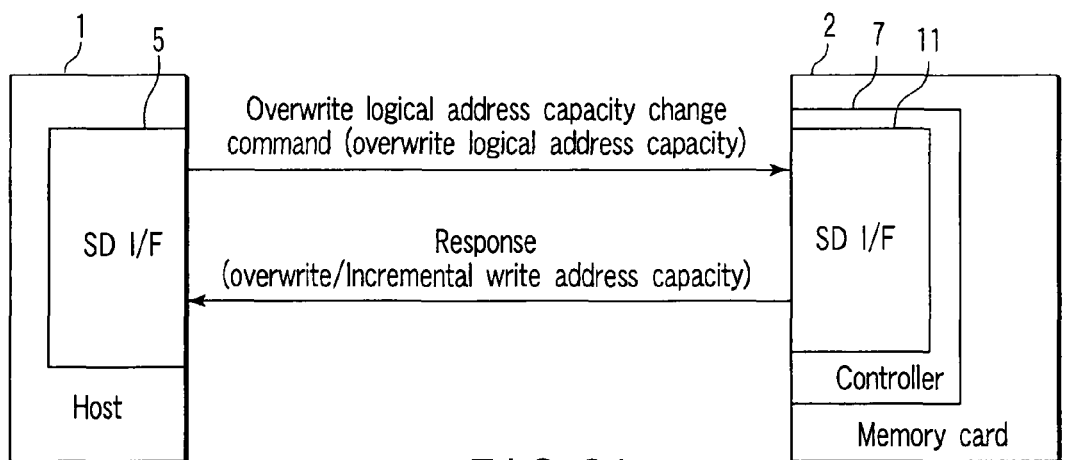
FIG. 24 is a diagram showing a configuration to change an overwrite type logical address capacity.

FIG. 24 is a diagram showing a configuration to change logical address.

As shown in FIG. 24, the host 1 issues overwrite logical address capacity change command to the memory card 2. In the command, as an argument, a capacity of overwrite logical address requested by the host 1 is described. When the controller 7 receives the command, the controller 7 updates control data related to a boundary of overwrite logical addresses. The memory card 2 transmits overwrite logical address capacity and the capacity of the incremental write logical address obtained by calculation to the host 1 as responses. When overwrite logical address capacity change command is used, the capacity of overwrite logical address can be easily changed. Set data required for the new setting is stored in the system data area 21.

When the boundary between overwrite logical addresses is changed, all the data in the user data area 24 have values which are not secured.

As described above, according to the host 1 (file system 4) and the memory card 2 (controller 7) according to the embodiment of the invention, a logical address allocated to management data used in a FAT file system is fixed. The management data is permitted to be overwritten, and file data is permitted to be subjected to only incremental write recording. In this manner, since the write scheme is rationalized into a write scheme depending on the characteristics of data (amount of data and write frequency), a high-speed write can be realized even in a large-capacity memory card 2.

Since a file system based on a FAT file system is used, the host 1 and the memory card 2 which are highly suitable for a conventional FAT file system can be realized.

In addition, various changes and modifications can be conceived by a person skilled in the art within the spirit and scope of the present invention. It is understood that the changes and modifications are included in the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A host device comprising:
  a memory system including a nonvolatile semiconductor memory and a controller which controls the semiconductor memory, the memory system being provided into the host device; and
  a file management system which allocates a plurality of clusters defined in a file allocation table (FAT) file system to data to be written in the memory and which manages the allocated data by using a management data including a file allocation table (FAT) and a directory entry which are defined in the FAT file system,
  the directory entry including a root directory entry serving as entry information of a root directory of an uppermost layer and a sub-directory entry serving as entry information of a sub-directory belonging to the root directory, and wherein the file management system allocates the plurality of clusters in a predetermined range, the management data stored in a management data block is allocated to a logical address belonging to a first range from a lowest-order logical address and a file data stored in a file data block which is different from the management data block is allocated to the logical address belonging to a second range different from the first range, and the first range of the logical address is an overwrite logical address to which an overwrite is performed, and the second range of the logical address is an incremental write logical address to which an incremental write is performed.

2. The host device according to claim 1, wherein the file management system allocates one of the plurality of clusters to a data area including the management data regardless of whether the cluster is unallocated or allocated.

3. The host device according to claim 1, wherein the file management system allocates only the cluster having an order higher than that of the allocated cluster to write data other than the management data.

4. The host device according to claim 1, wherein the management data includes a bit map table representing whether one of the plurality of clusters is allocated or not.

5. The host device according to claim 1, wherein the memory system is a memory card, and the semiconductor memory is a NAND flash memory.

6. The host device according to claim 1, wherein the controller receives write data to which a unique logical address is allocated, and wherein the controller accepts a write command of the write data to which an allocated logical address is allocated when the logical address allocated to the write data belongs to a first range, and the controller accepts a write command of only the write data to which a logical address having an order higher than that of the allocated logical address is allocated when the logical address allocated to the write data belongs to a second range.

7. A memory system comprising:

a nonvolatile semiconductor memory and a controller which controls the semiconductor memory, the controller configured to receive data which is written in the memory, perform an overwrite of the data which is allocated to an overwrite logical address, and perform an incremental write of the data which is allocated to an incremental logical address, wherein the data is allocated in a predetermined range by using a file management system, the file management system allocates a plurality of clusters defined in a file allocation table (FAT) file system to the data, the file management system manages the allocated data by using a management data including a file allocation table (FAT) and a directory entry which are defined in the FAT file system, the directory entry includes a root directory entry serving as entry information of a root directory of an uppermost layer and a sub-directory entry serving as entry information of a sub-directory belonging to the root directory, the management data stored in a management data block is allocated to the overwrite logical address belonging to a first range from a lowest-order logical address, and a file data stored in a file data block which is different from the management data block is allocated to the incremental logical address belonging to a second range different from the first range.

8. The memory system according to claim 7, wherein the controller controls that a control scheme for allocating the logical address and a physical address corresponding to the logical address in the first range is different from that in the second range.

9. The memory system according to claim 7, wherein a data copy from one semiconductor memory address to another semiconductor memory address is not performed, when a data writing to the second range is a data writing to a discrete address.

10. The memory system according to claim 7, wherein, after the memory system is initialized, a data write request is accepted from a host device, which accesses the memory system, after a signal for requesting data write permission is received from the host.

11. The memory system according to claim 7, wherein the controller has a function of outputting information representing the logical address belonging to the second range to the outside in response to a request from a host which accesses the memory system.

12. The memory system according to claim 7, wherein the controller has a function of shifting a state of the logical address belonging to the second range is not been allocated a request from a host to access the memory system is received.

13. the memory system according to claim 7, wherein the controller has a function of changing the first range and the second range in response to a request from a host which accesses the memory system.

14. The memory system according to claim 7, wherein the semiconductor memory has a function of storing data of a plurality of bits in one memory cell.

15. The memory system according to claim 14, wherein the controller writes the write data to which the logical address belonging to the first range is allocated by storing m-bit (m is an integer not less than 1) data in the memory cell, and wherein the controller writes the write data to which the logical address belonging to the second range is allocated by storing n-bit (n is an integer given by n >m) data in the memory cell.

16. The memory system according to claim 7, wherein the nonvolatile semiconductor memory stores data in storage units constituted by a plurality of memory cells and erases data in units of blocks constituted by the plurality of storage units.

17. The memory system according to claim 16, wherein the controller manages a correspondence of the logical address belonging to the first range to the storage units in which the write data to which the logical address is allocated is stored.

18. The memory system according to claim 17, wherein the controller manages a correspondence of a logical block constituted by the plurality of logical addresses belonging to the second range to the block including the storage units in which the plurality of write data to which the logical addresses belonging to the logical block are allocated are stored.

19. The memory system according to claim 7,
wherein the semiconductor memory stores a file allocation table (FAT) defined by a file allocation table (FAT) file system.

20. The memory system according to claim 19,
wherein the controller holds information representing whether the controller rewrites the file allocation table or not.

21. The host device according to claim 1, wherein the controller receives a command which requests a transmission of a final allocated logical address or a highest-order of overwrite logical address and in response to the command the controller transmits the final allocated logical address or the highest-order overwrite logical address, via an SD interface.

22. The host device according to claim 1, wherein the controller receives a request for reading data of a specific area and in response to the request the controller transmits a final allocated logical address or a highest-order of overwrite logical address, via an SD interface.

* * * * *